United States Patent [19]
Scott

[11] 3,875,704
[45] Apr. 8, 1975

[54] APPARATUS FOR AUTOMATICALLY BEVELING THE RIM OF A VESSEL

[75] Inventor: John E. Scott, Columbus, Ohio

[73] Assignee: Owens-Illinois, Inc., Toledo, Ohio

[22] Filed: Oct. 20, 1972

[21] Appl. No.: 299,348

Related U.S. Application Data

[62] Division of Ser. No. 158,376, June 30, 1971, Pat. No. 3,739,532.

[52] U.S. Cl. .................................................. 51/235
[51] Int. Cl. ..................... B24b 41/06; B24b 51/00
[58] Field of Search ...... 51/235, 216 R, 283, 216 T, 51/216 ND, 105 EC, 165.75, 165.76, 215 UE, 215 AR, 215 R

[56] References Cited
UNITED STATES PATENTS

| | | | |
|---|---|---|---|
| 176,525 | 4/1876 | Fry | 51/235 |
| 1,368,263 | 2/1921 | Johnston | 51/235 UX |
| 2,085,908 | 7/1937 | Huck | 51/235 X |
| 2,097,135 | 10/1937 | Schutz | 51/235 X |
| 2,704,425 | 3/1955 | D'Avaucourt | 51/215 UE |
| 2,771,716 | 11/1956 | Joyce | 51/105 EC |
| 2,780,895 | 2/1957 | Silven | 51/105 EC |
| 2,955,390 | 10/1960 | Phillips | 51/235 X |
| 2,966,010 | 12/1960 | Guignard | 51/235 X |
| 3,245,130 | 4/1966 | Dowley | 51/235 X |
| 3,381,347 | 5/1968 | Reinwall | 51/283 X |
| 3,521,412 | 7/1970 | McCarty | 51/317 |
| 3,688,451 | 9/1972 | Schnellman | 51/216 ND |

FOREIGN PATENTS OR APPLICATIONS

| 23,334 | 12/1914 | United Kingdom | 51/235 |
|---|---|---|---|

*Primary Examiner*—Donald G. Kelly

[57] ABSTRACT

The features of the invention are illustrated in a preferred embodiment which provides novel apparatus for carrying out the method of automatically beveling the edges or rims of television picture tube funnel or viewing panel components. The components are delivered to an input station from which they are successively transferred to an edge beveling station. Each component is clamped at the beveling station with the rim at a predetermined height. The rim edges are contacted with edge beveling means also located to bevel at the same predetermined height. The edge beveling means and the rim are moved with respect to each other at the predetermined height until the beveling is completed to obtain a uniform bevel completely around the rim. The completion of the beveling operation is sensed to release the clamping of the component at the beveling station and the beveled component is transferred to a discharge station. A component to be beveled is advantageously transferred from the input station to the beveling station while a beveled component is being transferred from the beveling station to the discharge station. Each component is aligned at the input station to insure proper orientation for transferring the component to the beveling station to enable clamping. The beveling of components is limited in accordance with the requirements of a successive operation station.

8 Claims, 23 Drawing Figures

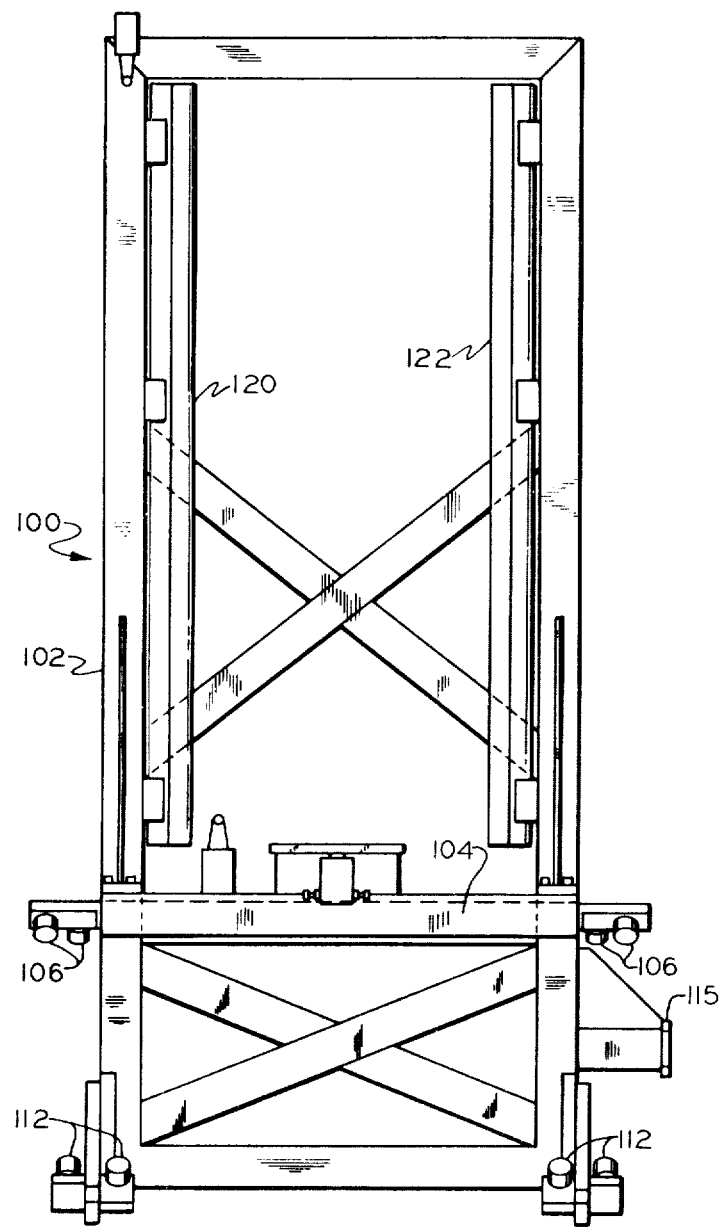
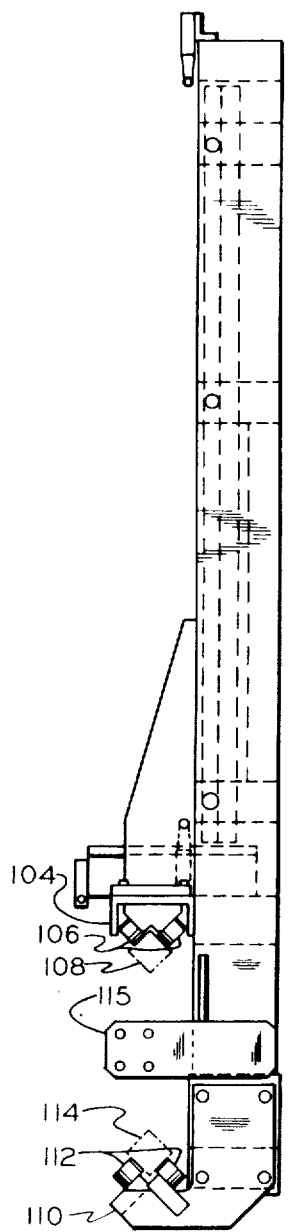
FIG. 4
FIG. 5

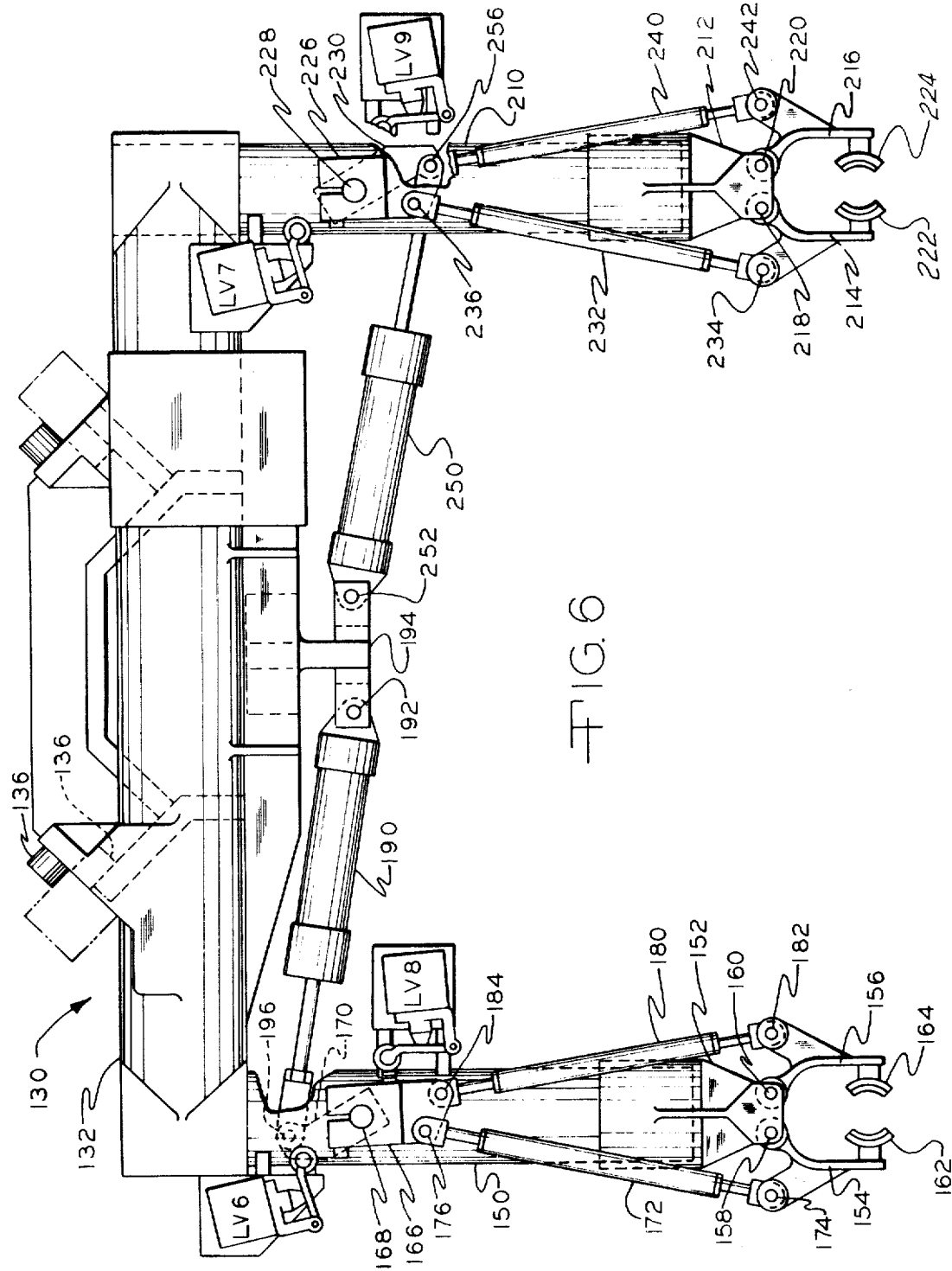

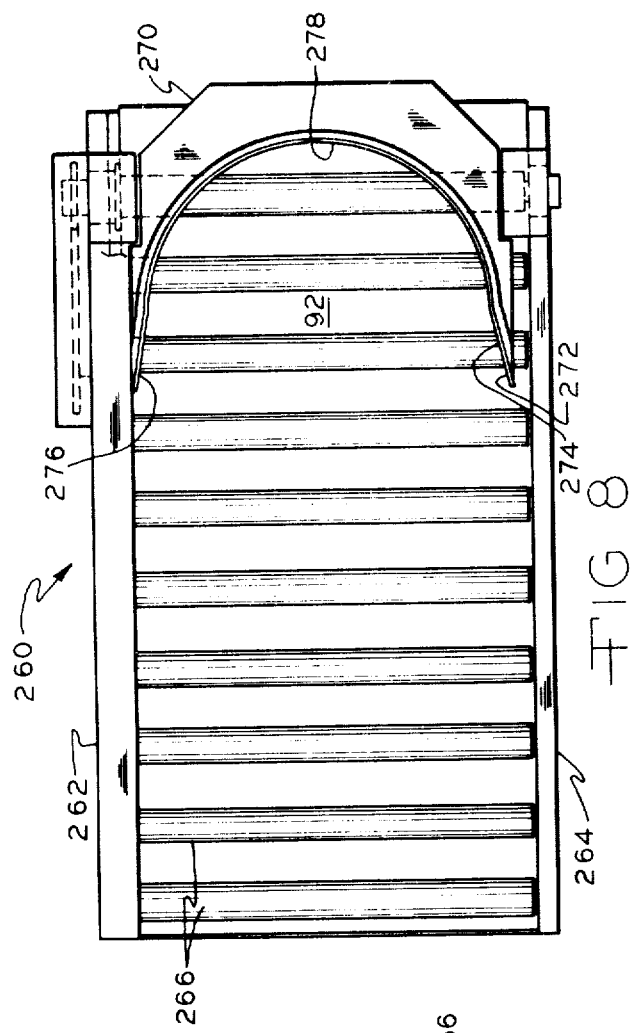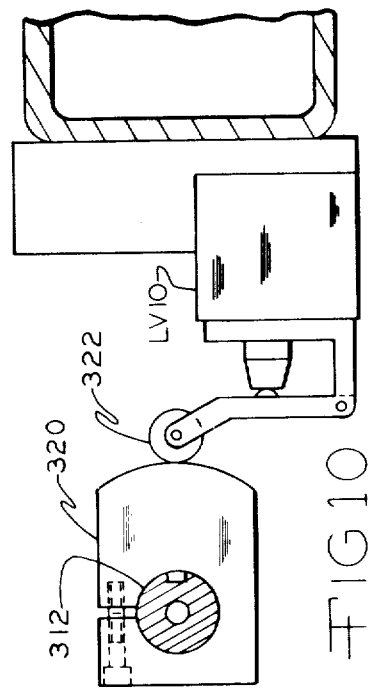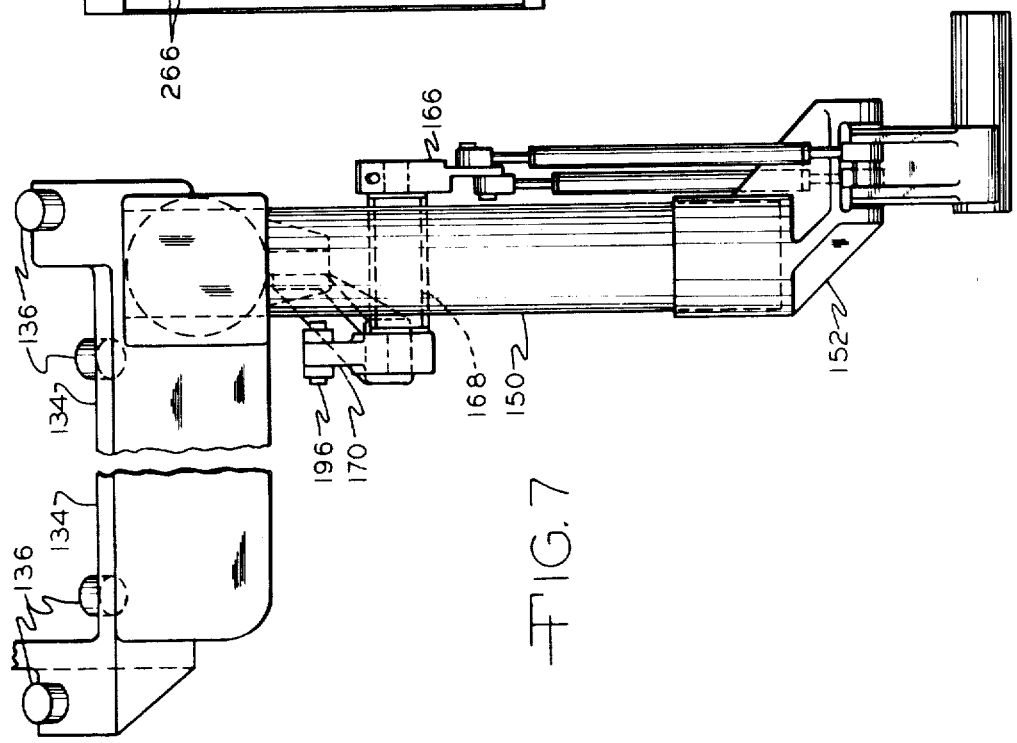

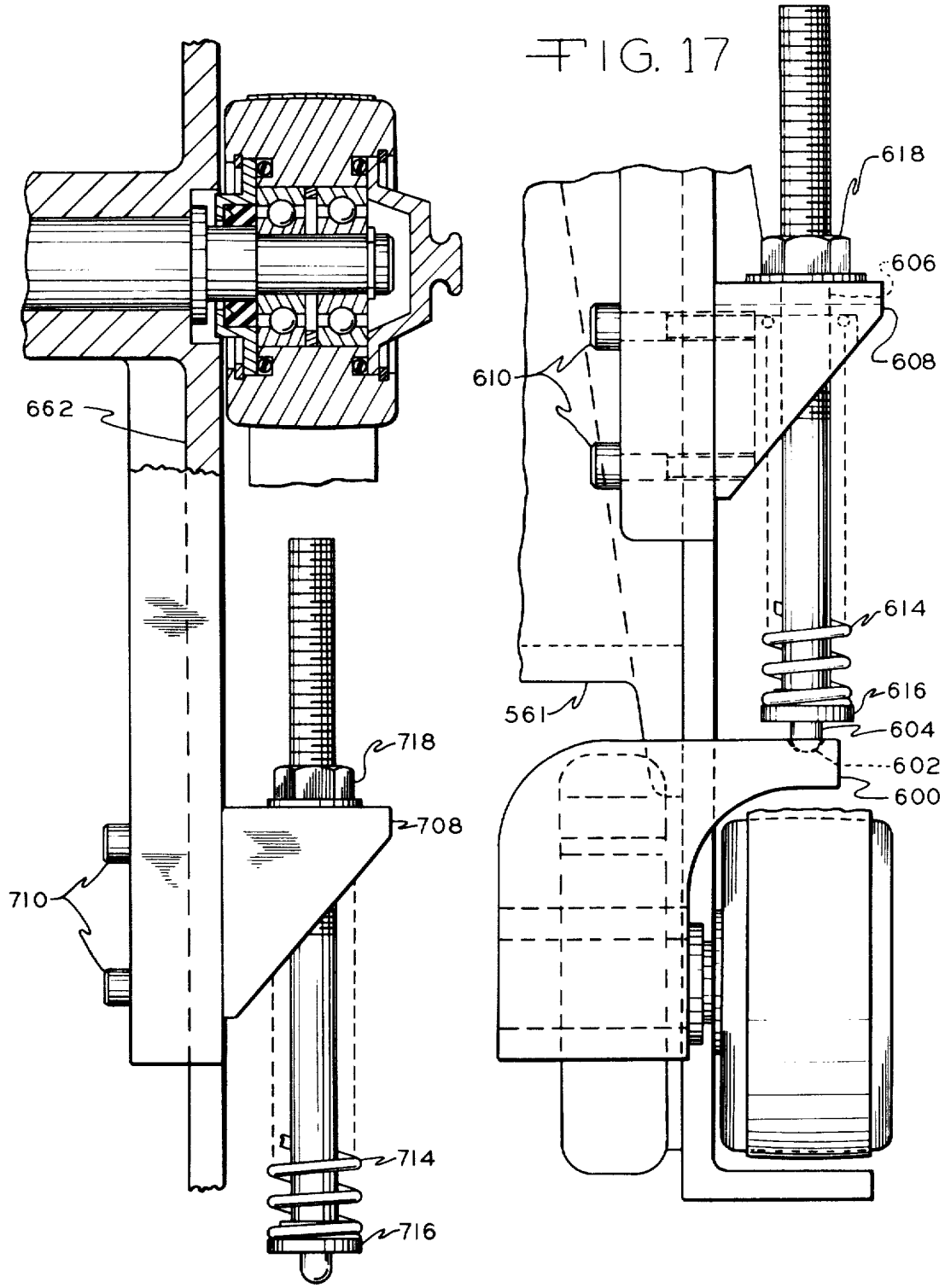

APPARATUS FOR AUTOMATICALLY BEVELING THE RIM OF A VESSEL

This is a division of application Ser. No. 158,376 filed June 30, 1971, now U.S. Pat. No. 3,739,532, issued June 19, 1973.

BACKGROUND OF THE INVENTION

It is oftentimes desired to bevel the inner and outer borders of the open ends of vessels having generally eliptical configurations. For example, the sealing edges of rectangular televison picture tube funnel and viewing panel parts have relatively sharp borders which are succeptible to bruise checking and it is, therefore, desirable to bevel such borders to reduce the possibility of such checking to the extend possible. This is particularly true for funnel and viewing panel parts for color television picture tubes since such tubes must be evacuated to a greater degree then similar parts for monochromatic television picture tubes. Furthermore, the viewing panels for color picture tubes are subject to much more handling than are their counterparts for monochromatic picture tubes and are, therefore, subject to greater chances of bruise checking.

Previously, the borders of the sealing edges of the television parts mentioned have been manually beveled in a time consuming and relatively expensive operation. It is desirable to eliminate the hand grinding or beveling of the borders of the edges and to provide a convenient means or apparatus for power grinding of the borders to reduce the time required for the grinding or beveling of the borders. Apparatus has been proposed eliminating hand grinding as shown in U.S. Pat. No. 3,550,322, issued Dec. 29, 1970. However, the apparatus disclosed in the above-mentioned patent does not eliminate completely manual operations with respect to edge beveling and does not provide the bevel uniformity desired.

Accordingly, it is an object of this invention to provide novel method and apparatus for automatically transferring vessels into a beveling station for the beveling operation and transferring the beveled component out of the beveling station when the beveling is completed.

It is a further object of this invention to provide an improved edge beveling apparatus for the open end of vessels having generally eliptical configurations.

It is still further object to provide an improved transfer mechanism which is particularly advantageous for use with the edge beveling apparatus disclosed herein, but which may be utilized for transferring articles into and out of a general operations station.

It is another object of this invention to provide an improved vacuum chuck arrangement.

SUMMARY OF THE INVENTION

In carrying out the above objects the invention is disclosed in apparatus for automatically edge beveling television picture tube components. An input station, an edge beveling station, and a discharge station are shown, the stations being spaced the same distance apart. Transfer means are provided for moving components between the stations and includes a first carriage horizontally movable along the stations and a second vertically movable carriage, one of the first and second carriages being mounted on and movable with the other of the carriages. The second carriage has two spaced component handling or article handling arms extending over the stations. Means are provided for raising and lowering the second carriage to enable pickup of components at the input and edge beveling stations and the deposit of components at the beveling and discharge stations, respectively. Means are also provided for moving the first carriage back and forth enabling transfer of components between successive stations.

The input station may include a delivery conveyor and an alignment fixture having an alignment channel above and opening upstream of the run of the conveyor. The aligning channel includes a semicircular terminal portion having a diameter equal to the diagonal of the component, and channel sides extending outwardly toward the edges of the conveyor to direct the component into the terminal portion of the channel.

Means responsive to the presence of a component at the input station enables a component transfer cycle by the transfer means. Means responsive to the presence of a component at the discharge station inhibits a component transfer cycle by the transfer means.

Each of the component handling arms includes means for engaging a component to transfer the component. Means are provided for sensing that the horizontally movable carriage has positioned the component handling arms at the input and beveling stations, and for sensing that the vertically movable carriage is lowered to a component grasping position to enable operation of the component engaging means on each of the arms to grasp the component. The operation of the component engagement means is sensed to enable operation of the means for raising the second carriage.

The arrival of the component handling arms above the beveling and discharge stations is sensed to enable operation of the means for lowering the second carriage. Means are further provided for sensing that the horizontally movable carriage has positioned the component handling arms at the beveling and discharge stations and for sensing that the vertically movable carriage is lowered to a component releasing position to enable operation of the component engaging means on each of the arms to release the component grasped thereby. The releasing operation of the component engaging means is sensed to enable the first carriage movving mesna to return the component handling arms to a position above the input and beveling stations. Means responsive to the completion of beveling cycle at the beveling station are provided for enabling a component transfer cycle by the transfer means. Means are also provided which are responsive to the presence of a component at the input station for inhibiting operation of the delivery conveyor means to provide more components at the station.

The beveling station includes means for supporting the vesssel and moving the rim of the open end thereof past at least two edge beveling stations or units. Each of the edge beveling stations preferably includes a flexible endless belt having a normally flat straight working run provided with an abrasive surface, a pair of spaced guide pulleys over which the belt is trained to support the same, means for driving the belt over the guide pulleys, and means operable to move the guide pulleys to position the working run of each belt into and out of contact with an inner and an outer edge, respectively, of the rim at an acute angle with respect to the rim.

Each spaced pair of guide pulleys are supported on a substantially vertical plate. A take-up pulley is provided on each plate, also having the belt trained therearound. Means are provided for journally supporting each take-up pulley. The journal support means for each take-up pulley is yieldingly biased against the pull of the belt trained therearound.

If the vessel has a configuration with at least one portion thereof extending further away from the axis of vessel movement or rotation than other rim portions, such as a rectangulr picture tube, it is advantageous to provide means for yieldingly biasing the pairs of guide pulleys toward the outside edge of the vessel rim to maintain belt contact therewith. Stop means may be provided for limiting movement of the outside edge guide pulleys away from the vessel in response to movement of the outwardly extending rim configuration portion past the outside edge guide pulleys, whereby the yieldingly biasing means for the take-up pulley and the yieldingly biasing means for the outside edge guide pulleys cooperate to provide an increased combined spring force to urge the belts against the outside of the outwardly extending configuration portion of the vessel rim.

The vessel supporting and moving means advantageously includes rotatable spindle means and vacuum chuck means carried on the end of the spindle means for selectively clamping the vessel to the spindle means. The vacuum chuck means advantageously includes a first sealing means having a peripheral configuration which substantially mates with a first internal cross section of a vessel being clamped, and a second sealing means having a peripheral configuration which substantially mates with a second larger internal cross section of the vessel being clamped. The first and second sealing means are maintained in a spaced relationship enabling their mating with the first and second internal cross sections at the same time. Passage means are provided for enabling creation of a partial vacuum in a space defined by the first and second sealing means and an interior wall of a vessel located between the sealing means and mated therewith.

The edge beveling station further includes means responsive to the clamping of a vessel by the vacuum chuck means for initiating rotation of the spindle means. Means responsive to the completion of an edge beveling cycle is provided for terminating rotation of the spindle means and for deactivating the vacuum chuck means. Operation of the belt driving means is initiated in response to the clamping of a vessel by the vacuum chuck means, and the belt driving means is deactivated in response to the completion of an edge beveling cycle.

The guide pulley moving means for each edge beveling station includes means for yieldingly biasing each of the pairs of guide pulleys toward the vessel rim, and means for positively retracting each of the pairs of guide pulleys from the vessel rim. The placing of a vessel on a support means in edge having beveling position is sensed to inhibit the action of the guide pulley retracting means to enable the guide pulley biasing means to move the belts into edge beveling contact with the rim. The completion of the edge beveling cycle is sensed to activate the retracting means to move the belts out of contact with the vessel rim.

A positive pressure may be advantageously applied to the vacuum chuck means in response to the completion of an edge beveling cycle to insure release of the vessel from the vacuum chuck means.

Other objects, advantages and features of this invention will become apparent when the following description is taken in conjunction with the accompanying drawings, in which:

FIG. 4 is a side elevational view of a horizontally movable carriage portion of the transfer device of this invention;

FIG. 5 is an end elevational view of the apparatus illustrated in FIG. 4, taken from the right side thereof;

FIG. 6 is a plan view of a vertically moving carriage supported on the horizontally moving carriage, and the article engaging mechanisms extending therefrom, of the transfer device of this invention;

FIG. 7 is an end elevational view of the apparatus illustrated in FIG. 6, taken from the left side thereof;

FIG. 8 is an enlarged plan view of the delivery conveyor and the ware alignment fixture associated therewith;

FIG. 10 is a cross-sectional view of the apparatus illustrated in FIG. 9 taken along lines X—X thereof;

FIG. 17 is an enlarged fragmentary view of the belt tensioning means of the unit illustrated in FIG. 15, taken from the right side of FIG. 15;

FIG. 20 is an enlarged fragmentary view, partially in section, of a portion of the belt tensioning means for the apparatus of FIG. 18;

DESCRIPTION OF THE PREFERRED EMBODIMENT

Figure 1:
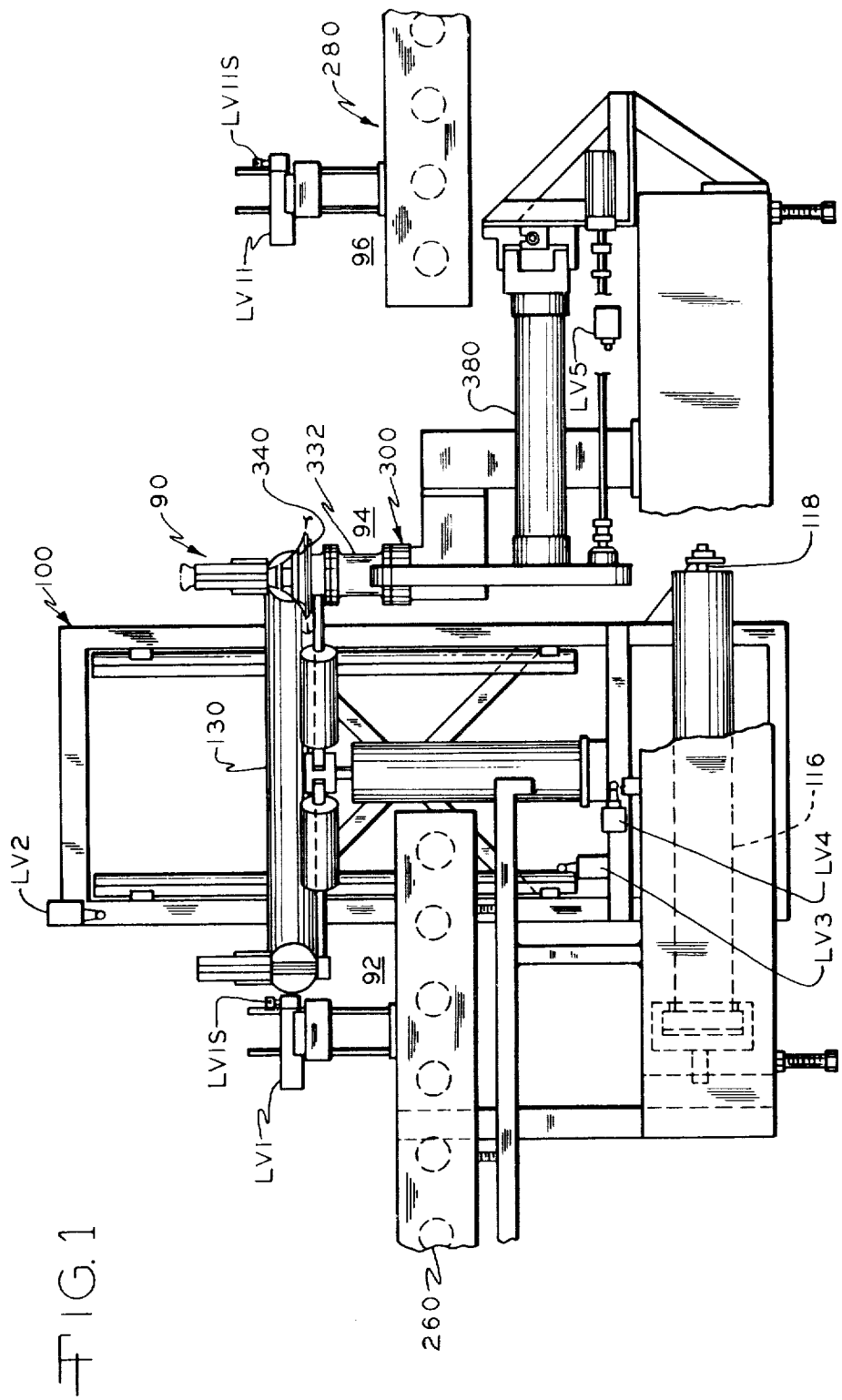
FIG. 1 is a partially diagrammatic side elevational view of apparatus embodying the teachings of this invention with portions of some parts being omitted for the purposes of clarity, the omitted portions being shown in greater detail in later figures.
Figure 2:
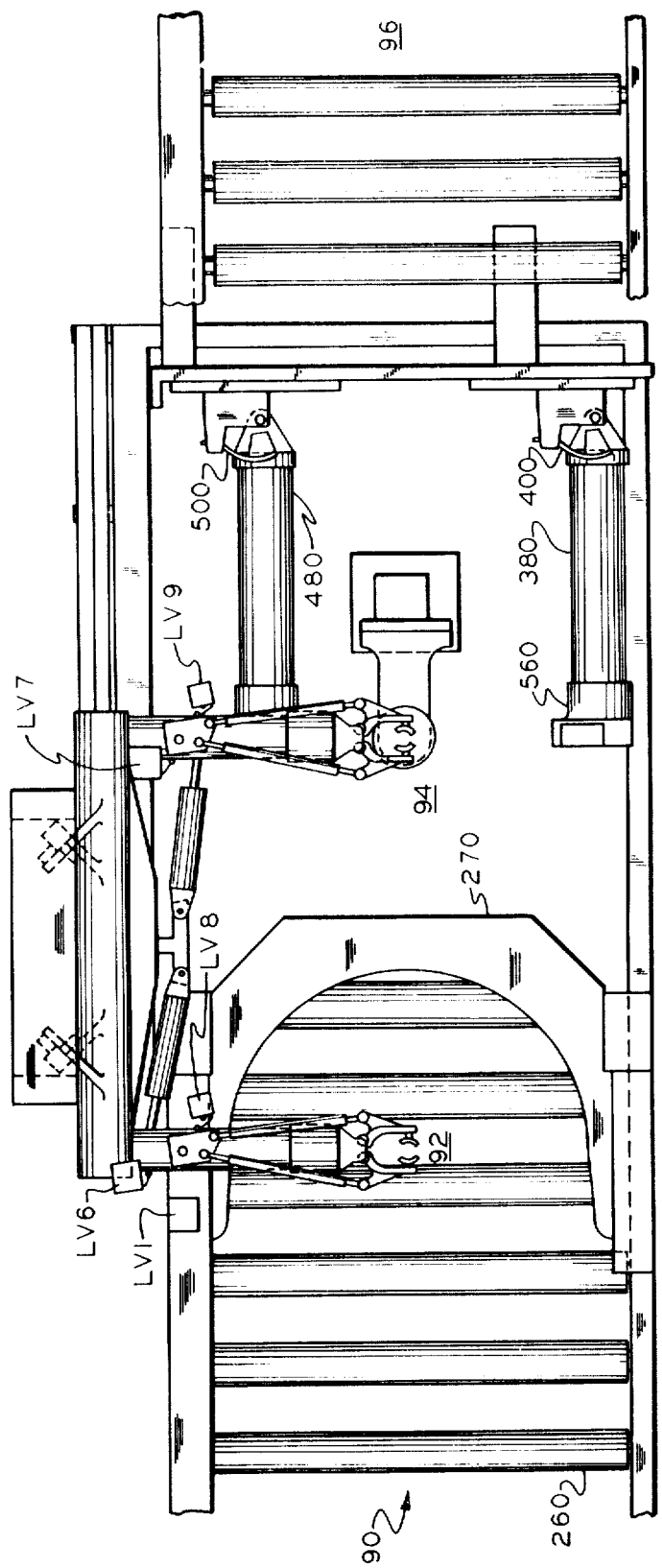
FIG. 2 is a plan elevational view of the apparatus illustrated in FIG. 1.
Figure 3:
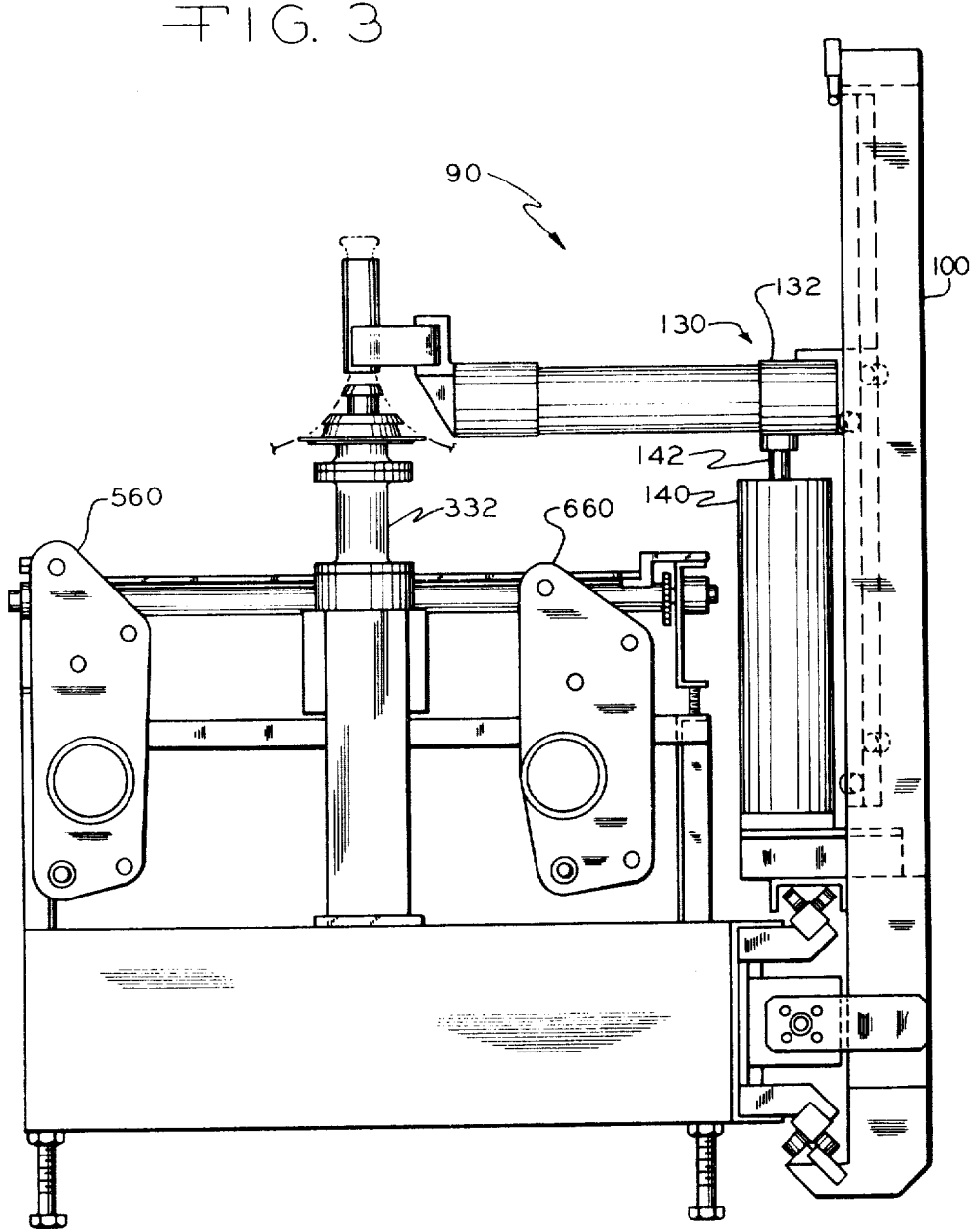
FIG. 3 is an end elevational view of the apparatus illustrated in FIG. 1, taken from the right side thereof.

Referring to FIGS. 1, 2 and 3 there is illustrated a general assembly layout of a machine 90 which incorporates the teachings of this invention in automatically edge beveling television components parts. An input station is designated generally at 92, a beveling or operations station is designated generally at 94, and an output or discharge station is designated generally at 96. A first carriage 100 is mounted for horizontal reciprocable movement longitudinally along the three stations. A second carriage 130 is mounted for vertical reciprocable movement on the first carriage 100. An air fluid cylinder 116, best seen in FIG. 1, is provided for moving the first carriage 100 back and forth along the stations. A second air or fluid cylinder 140, best seen in FIG. 3, is provided for vertically moving the second carriage 130 up and down on the supporting first carriage 100.

A pair of spaced transfer arms 150 and 210 extend out from the carriage 130 over the process line. The spacing between the arms 150, 210 matches the spacing between the machine stations. Article engaging means on the end of the arms 150, 210 are actuated open and closed by air cylinders 190 and 250 to grasp and pick up articles to move them between stations. A ware aligning fixture 270 is supported just above a delivery conveyor 260 which brings components to the input station 92.

A ware supporting and rotating means is indicated generally at 300 and includes a rotatable spindle having a vacuum chuck indicated generally at 340 for clamping the ware in place for the edge beveling operation. Edge beveling belt driving units 560 and 660 are illustrated diagrammatically in FIG. 3 and are positioned to edge bevel the outer and inner edges, respectively, of a vessel clamped in place on the vacuum chuck 340. Edge beveler support arms 380 and 480 for the belt drive units 560 and 660, respectively, are best seen in FIG. 2.

A limit valve LV1 is best seen in FIGS. 1 and 2 and is disposed at the input station 92 to detect by contact with the sensor rod LV1S the presence or absence of ware at the input station. Similarly, a limit valve LV11 is provided at the discharge station 96 and sensed via a sensor rod LV11S the presence or absence of ware on a discharge conveyor 280 at the discharge station.

Figure 9:
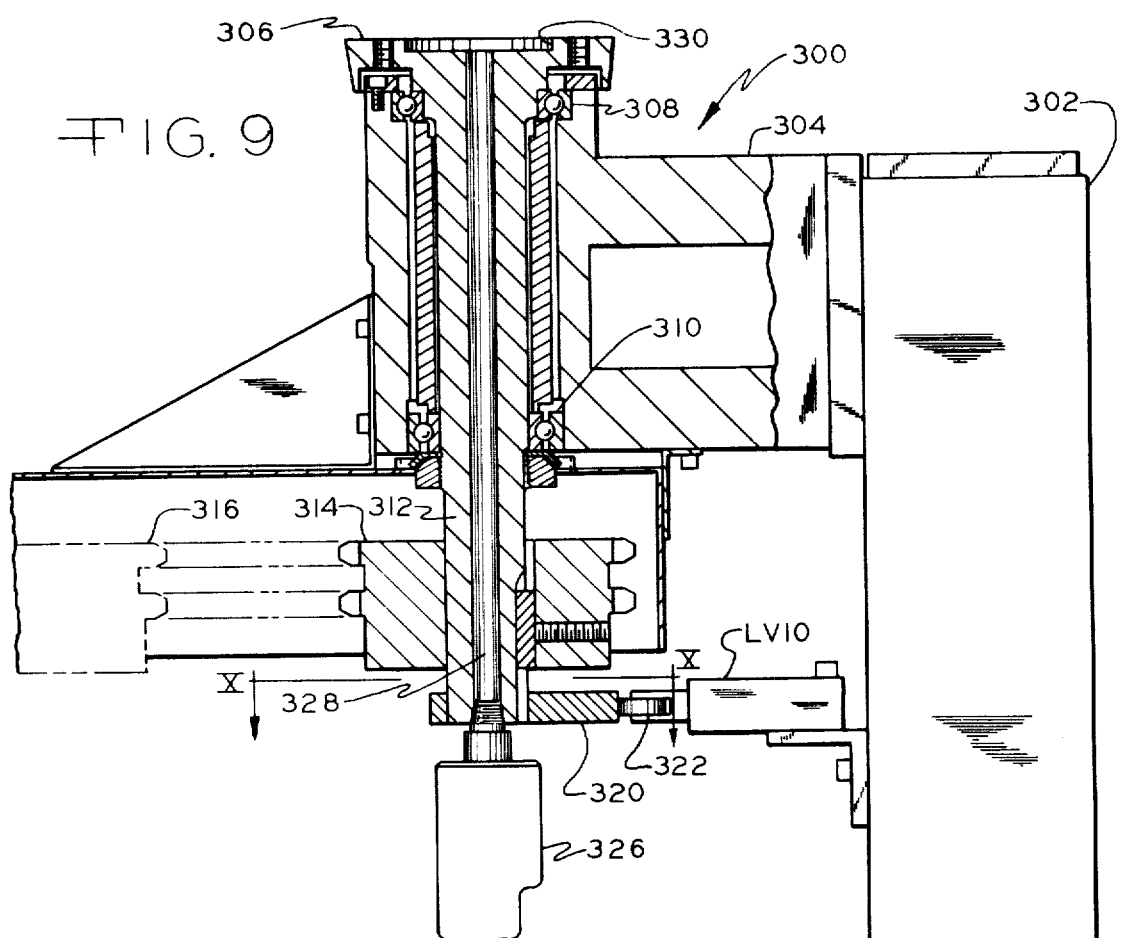
FIG. 9 is a side elevational view, partially in section, of the rotatable spindle at the beveling station.

As best seen in FIGS. 1 and 4, limit valves LV2 and LV3 are provided on the carriage 100 to detect the position of the carriage 130. Limit valves LV4 and LV5 are provided on the machine frame to detect the position of the carriage 100. Limit valves LV6 and LV7 are provided on the vertically movable carriage 130, best seen in FIGS. 2 and 6, to detect when the article engaging clamps are open. Limit valves LV8 and LV9 are also provided on carriage 130 to detect when the article engaging clamps are closed. A limit valve LV10 is illustrated in FIGS. 9 and 10 and provides an indication that the edge beveling cycle is complete and also indication of the position of the rotatable spindle.

The general layout of the components and sensors of the automatic edge beveling unit 90 having been described, the specific portions will be described in detail with respect to the illustrations in the remaining drawings, reference being made to FIGS. 1, 2 and 3 for the clarification, location and cooperation of the parts described.

Referring now to FIGS. 4 and 5 there is illustrated the horizontally movable carriage 100. A rectangular frame 102 is supported on an upper bracket 104 having spaced pairs of downwardly depending and angularly disposed wheels 106 which ride on an upper rail 108. The rail 108 is connected to the machine frame and extends along the direction of ware travel.

The rectangular frame 102 is also supported on a lower bracket 110 having spaced pairs of upwardly extending and angularly disposed wheels 112 which engage and ride along the lower side of a lower rail 114. The rail 114 is also connected to the machine frame and extends along the direction of ware travel.

A drive plate 115 is attached to the rectangular frame 102 and extends out between the rail 108, 114. The drive plate is to be attached to the piston rod 118 of the air cylinder 116 illustrated in FIG. 1. Retraction and extension of the piston rod 118 moves the carriage 100 back and forth in a longitudinal horizontal direction.

A vertical rail 120 is connected to the rectangular frame 102 and spaced from a vertical rail 122, also connected to frame 102, to define a vertical travel path for the vertically movable carriage 130.

Referring to FIGS. 6 and 7, the carriage 130 is illustrated in greater detail and is shown as including a horizontal cross arm 132 extending between downwardly depending legs 134. Each of the legs 134 carries spaced pairs of angularly disposed wheels 136, opposing pairs of the wheels 136 facing away from each other to engage and travel along the vertical rails 120, 122, supported on the carriage 100. An air cylinder 140, best seen in FIG. 3, is mounted on the carriage 100 and is connected via a piston rod 142 to the horizontal cross arm 132 of the carriage 130. Extension and retraction of the piston rod 142 raises and lowers the carriage 130.

An input transfer arm 150 is supported at one end on the cross arm 132 and has at the other end a clamp support bracket 152. Opposing chuck arms 154 and 156 are pivotally mounted on a bracket 152 at 158 and 160, respectively. Chuck adapters 162 and 164 are mounted on the chuck arms 154, 156 to enable engagement of the articles being transmitted, in this instance the neck of a funnel.

An upper drive crank 166 is secured to a vertical drive shaft 168 pivotally supported or mounted in the transfer arm 150. A lower drive crank 170 is secured to the lower end of the drive shaft 168.

A connecting rod 172 has one end pivotally connected at 174 to the chuck arm 154, and the other end pivotally connected at 176 to the upper drive crank 166. A connecting rod 180 has one end pivotally connected at 182 to the chuck arm 156, and the other end pivotally connected at 184 to the upper drive crank 166.

An air cylinder drive means 190 for the article engaging chuck arms has the cylinder end pivotally connected at 192 to a clevis device 194 extending out from the cross arm 132. The ros end of the air cylinder drive means 190 is pivotally connected to 196 to the lower drive crank 170.

In operation, when the piston rod of the air cylinder 190 extends, the lower drive crank 170 is pushed away from the cylinder 190, rotating the drive shaft 168 and pivoting the upper drive crank 166 in counterclockwise direction. The connecting rods respond to the arcuate movement of the end of the crank 166 toward the chuck support bracket to push the pivotally connected chuck arms 154, 156 on their pivots toward each other to the closed position shown in FIG. 6. Retraction of the piston rod of the air cylinder 190 reverses the operation of the linkage and opens the chuck arms 154, 156 to a position where they may pass the funnel necks horizontally without touching them when the carriage 100 moves longitudinally along the machine 90.

A discharge transfer arm 210 is supported at one end of the cross arm 132 and has on the other end thereof a clamp support bracket 212. Opposing chuck arms 214 and 216 are pivotally mounted on the bracket 212 at 218 and 220, respectively. Chuck adapters 222 and 224 are mounted in opposition on the chuck arms 214 and 216 to enable engagement of the article being transferred. The chuck adapters 222, 224 and 162, 164 may be changed to accommodate different sizes of ware being transferred. If a viewing panel is being processed for edge beveling instead of a funnel, than a vacuum cup suction pick up type of article engaging means may be utilized in place of the chuck arms illustrated in FIG. 6.

An upper drive crank 226 is secured to a vertical drive shaft 228 pivotally mounted in the transfer arm 210. A lower drive crank 230 is mounted on the lower end of the drive shaft 228. A connecting rod 232 has one end pivotally connected at 234 to the chuck arm 214 and the other end pivotally connected at 236 to the upper drive crank 226. A connecting rod 240 has one end pivotally connected at 242 to the chuck arm 216 and the other arm pivotally connected to the upper drive crank 226.

The air cylinder drive means 250 has the cylinder end pivotally connected at 252 to the clevis device 194 extending out from the cross arm 132, and the rod end pivotally connected at 256 to the lower drive crank 230. The air cylinder 250 operates in a manner similar to that described for air cylinder 190 in that extension of the rod of air cylinder 250 closes the chuck arms 214, 216, while retraction of the rod opens the chuck arms.

Limit valves LV6 and LV7 are mounted on cross arm 132 and, in response to movement of teh upper drive cranks 166, 266, provide a signal when the clamps are open. Similarly, limit valves LV8 and LV9 are mounted on the transfer arms 150 and 210, respectively, and in response to movement of the upper drive cranks 166, 226, provides a signal when the clamps are closed.

Referring now to FIG. 8, a delivery conveyor at the input station 92 is indicated generally at 260 and includes spaced frame members 262 and 264 which carry a plurality of driven rollers 266. A ware aligning fixture 270 is supported on frame members 262 and 264 just above rollers 266. An input channel 272 of the fixture 270 opens upstream of the run of the conveyor 260 to receive ware to be aligned.

A terminal or end portion of the channel 272 is indicated at 278. The arc described by the terminal portion 278 of the channel is a semicircle having a diameter equal to the diagonal length of the substantially rectangular components being processed by the machine. Opposing channel sides 274 and 276 extend outwardly toward the edges of the conveyor 260 to direct the rectangular tube components into the terminal end 278 of the channel 272. Since the diagonal and two sides of the rectangular tube define a right angle triangle, the semiconductor terminal portion 278 of the channel necessarily aligns the rectangular component so that the center of the diagonal is at the center of the semicircle, and thus the centrally located neck of the funnel is always positioned in the same place to enable accurate pick up by the neck clamp means described hereinbefore.

If a viewing panel is being processed the center of the diagonal of the face panel is again located at the center of the semicircle of the terminal portion 278, enabling accurate pick up at the center of the face panel and transfer to the edge beveling station in an aligned orientation each time. Proper orientation of either the formula or the face panel is important not only for aligning the component for engagement by the transfer device, but also for the proper positioning of the component on the vacuum chuck means at the edge beveling station to enable proper contact by the edge beveling belts or grinders being utilized. As noted hereinbefore, the chuck arms shown would be replaced by a vacuum suction cup article engaging means if face panels are being processed. Similrly, the vacuum chuck arrangement illustrated and described hereinafter would be replaced by a vacuum cup clamping means or other suitable means for engaging the interior face of viewing panel.

Figure 11:
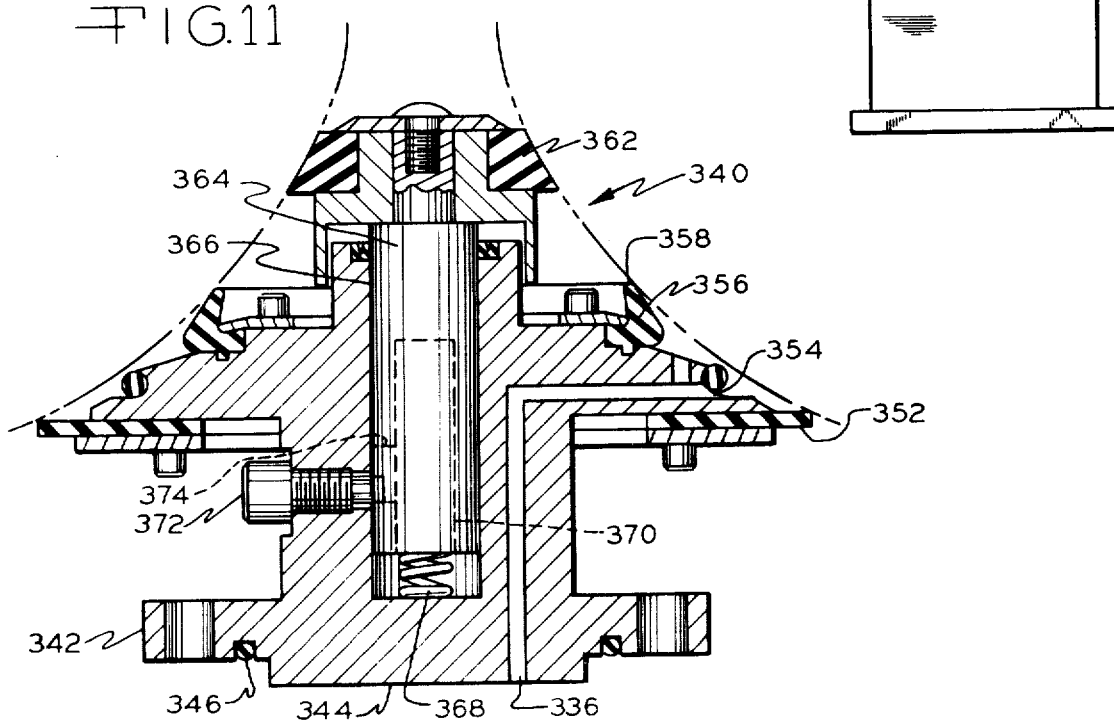
FIG. 11 is a cross-sectional side view of the vacuum chuck apparatus to be utilized at the beveling station mounted on the rotatable spindle.

Referring to FIGS. 9, 10 and 11 there is illustrated ware supporting and rotating means generally indicated at 300. A vertical standard 302 is secured to the frame of the machine. A spindle support arm 304 is cantilevered from the standard 302 and journally supports a spindle 306 in upper bearings 308 and lower bearings 310 carried in the arm 304. A lower end 312 of the spindle 306 extends below the lower bearings 310 and has drive pulley or sprocket means 314 secured thereto to be rotated via a belt, chain or other connecting means by a spindle motor pulley or sprocket 316.

A cam 320 is secured to the lower end 312 of the arm 306. A cam follower wheel 322 of the limit valve LV10 rides on cam 320 and senses the position of the spindle and thus the position of the ware. In the present instance, the edge beveling cycle is completed by one revolution of the rotatable spindle 306, therefore the limit valve LV10 may be utilized to sense the completion of an edge beveling cycle. If more than one revolution were required or if a fraction of a revolution were required, gearing may be connected to the spindle 306 to drive a cam to similarly indicate the completion of an edge beveling cycle.

A rotating union 326 provides communication between a vacuum source and a passage 328 formed through the center of the spindle 306. The passage 328 terminates in a plenum 330 at the upper end of the spindle. A spindle extender 332, as illustrated in FIG. 1, may be secured to the top of spindle 306 to vary the height at which the ware is supported. The spindle extender 332 again provides communication between the plenum 330 and a passage 336, in the vacuum chuck designated generally at 340 and shown in detail in FIG. 11.

The vacuum chuck 340 includes a base 342 which has a downwardly extending guide 344 which fits partially into and forms the top of the plenum 330 formed in the top of the spindle 306 or the spindle extender 332. An O ring 346 forms a seal between the base 342 and the extender 332 or the spindle 306. When various sizes of ware are being processed various sizes of spindle extenders may be utilized to properly position the rim of the ware with respect to the edge beveling equipment.

A first or lower annular flexible sealing ring 352 is secured to the vacuum chuck head below the laterally directed opening 354 of the passage 336. The sealing means 352 has a peripheral configuration which is substantially mates with a larger internal cross section of the television funnel or vessel being clamped. A second or upper flexible annular sealing member 356 is secured to the vacuum chuck head above the opening 354 from passage 336. The sealing means 356 has a peripheral configuration which substantially mates with a relatively smaller cross section of the vessel being clamped. An upwardly and inwardly extending flange 358 of the seal 356 is shaped to receive the diminishing cross section of the funnel, and to pull against the funnel in response to a vacuum introduced in passage 336. An extension of the base 342 maintains the first and second sealing means in a spaced relationship enabling their mating with the first and second internal cross sections at the same time.

The passage 336 provides communication between the space defined by the first and second sealing means and an interior wall of a vessel on the vacuum chuck which extends between the sealing means and is mated therewith, and a passage connection means, such as a rotary union, exterior of the defined space. Thus the reaction of pressure in the passage 336 below the ambient pressure creates a partial vacuum in the defined space to clamp the vessel to the sealing means.

The peripherally extending flexible portions of the seals 352 and 356 are advantageously formed to have a surface which describes an acute angle adjacent a wall of a vessel, enclosing the defined space. This enables each flexible peripheral portion to act as a check valve in response to the creation of a partial vacuum in the defined space, since the exterior ambient pressure will be pushing the flxible peripheries of the sealing means against the vessel wall.

A resilient annular neck seat 362 is secured to the top of a seat pin 364 which is mounted for reciprocable sliding movement in a vertical bore 368 formed in the head 340. One end of a seat biasing spring 368 is received in a spring housing 370 formed in the pin 364 and extends out of the housing to abut the bottom of the bore 366 and urge the pin 364 upwardly. Travel of the pin 364 is limited by a stop member 372 which is received in a vertical slot 374 formed in the side of the pin 364.

Although the neck seat 364 is annular in shape in this application to accommodate the neck of a funnel being processed, the seat member 362 generically has a peripheral configuration which contacts an internal wall of a vessel at a cross section thereof which is smaller than that contacted by the sealing means 356. The spring 368 yielding biases the seat member 362 away from the sealing means. The biasing force of the spring 368 is smaller then the clamping force exerted by the creation of a partial vacuum in the defined space between the two seals, but is advantageously sufficiently large to free the vessel from the sealing means in response to the release of the partial vacuum in passage 336.

Figure 12:
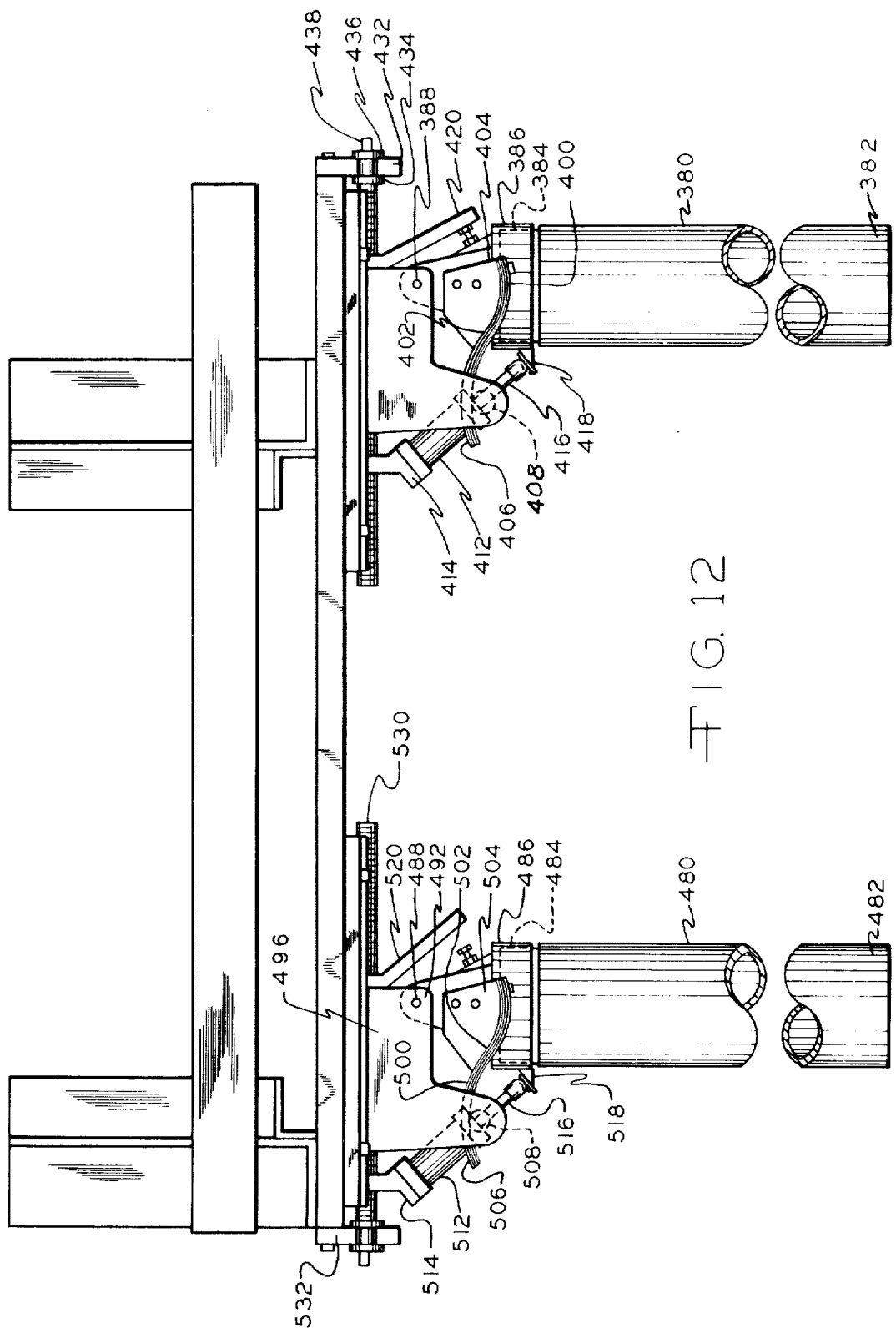
FIG. 12 is a plan view of the support means for the belt driving units at the beveling station.
Figure 13:
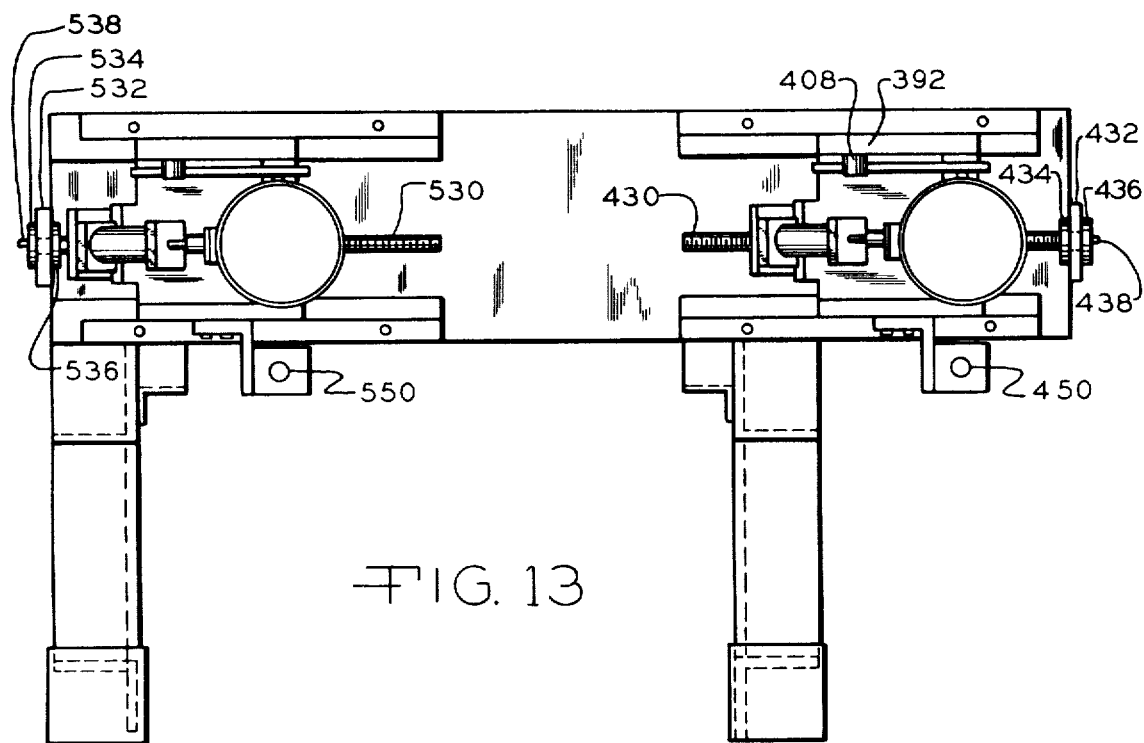
FIG. 13 is a side elevational view of the apparatus illustrated in FIG. 12.
Figure 14:
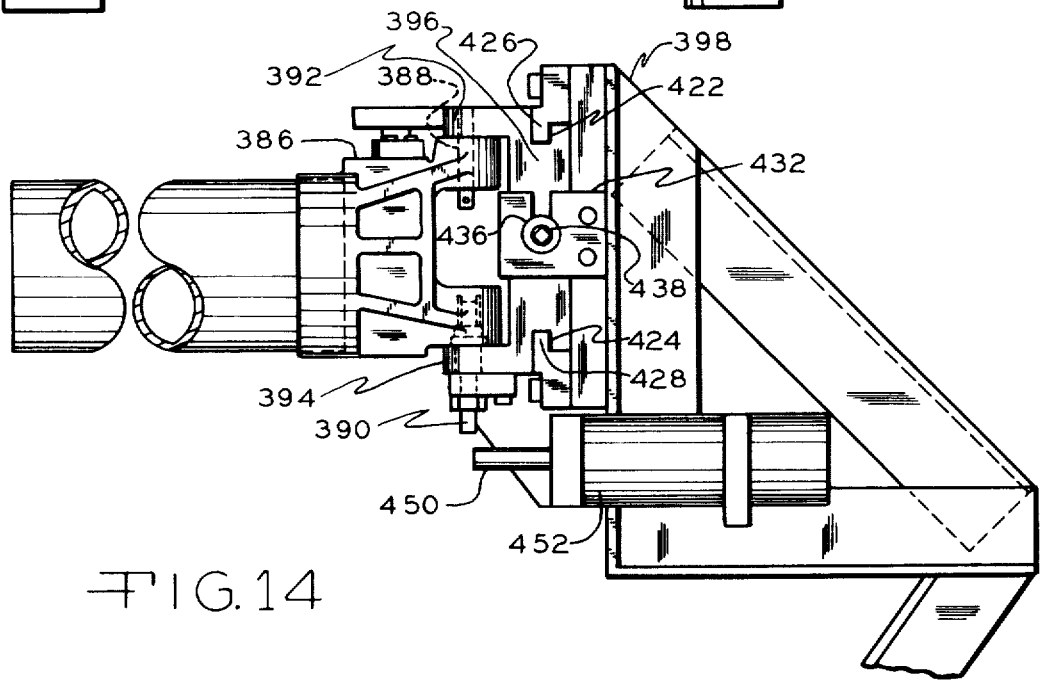
FIG. 14 is an end elevational view of the apparatus illustrated in FIG. 13, taken from the right side thereof.

Referring to FIGS. 12, 13 and 14 there is illustrated the edge beveler or grinder support arms 380 and 480. The outside edge beveler support arm 380 carries an outside edge grinding means on one end 382. The other end 384 of the arm 380 is connected to pivotable bracket 386. The bracket 386 is pivoted on pins 388 and 390 extending through flanges 392 and 394, respectively, of a flange bracket 396 attached to a frame portion 398.

A multi-layer leaf spring means 400, which exerts a substantially constant pivoting force on arm 380, is connected to an arcuate surface 402 of a spring support block 404 on the pivotable bracket 386. An arcuately shaped section 406 of the spring 400 engages a downwardly extending cam roller 408 suspended from the flange 392 of the flange bracket 396. The spring thus yieldingly urges arm 380 inwardly toward the outer edge of the rim of the ware supported on the vacuum chuck.

An air cylinder 412 is secured to an extension 414 of the flange bracket 396 and has a piston rod 416 extending therefrom. A rod stop 418 carried on the arm 380 is yieldingly urged againat the rod 416 by the spring 400. A stop bracket 420 extends from the other side of the flange bracket 396 and limits movement of the arm 380 and the pivotal bracket 386 away from the ware in response to an extension of air cylinder rod 416.

The flange bracket 396 has a horizontal upper groove 422 and a horizontal lower groove 424 for receiving support tongues 426 and 428, respectively, which are connected to the frame. This enables sliding adjusting movement of the bracket 396 with respect to the frame 398 and thus with respect to the ware support spindle. An externally threaded adjustment rod 430 is received in mating threaded apertures formed in bracket 396. One end of the rod 430 is retained in an upwardly opening U-shaped bracket 432 by restraining collars 434 and 436 secured to the rod 430 on each side of the bracket 432. Thus a turning of the end 438 of the rod 430 causes the flange bracket 396 to move laterally with respect to the direction of ware travel and support.

A drive shaft 450 for the belt grinder supported on the grinder arm 380 extends from a belt grinder drive motor 452 (best seen in FIG. 14) for connection by a flexible drive coupling to the drive wheel or pulley of the belt grinder drive unit. An inside edge beveler support arm 480 carries an inside edge beveling or grinding means on one end 482. The other end 484 of the arm 480 is connected to a pivotable bracket 486. The bracket 486 is pivoted on pins extending through flanges 492 of a flange bracket 496 attached to frame portion 398 in the same manner as that described for the arm 380. A multi-layer leaf spring means 500, again exerting a substantially constant pivoting force on the arm 480, is connected to an arcuate surface 502 of a spring support block 504 on the pivotal bracket 486. An arcuately shaped section 506 of the spring 500 engages a downwardly depending cam roller suspended from the flange 492 of the flange bracket 496 and yieldingly urges the arm 480 outwardly toward the inner edge or rim of ware supported on the vacuum chuck.

An air cylinder 512 is secured to an extension 514 of the flange bracket 496 and has a piston rod 516 extending therefrom. A rod stop 518 on the rod arm 480 is yieldingly urged against rod 516 by the spring 500. A stop bracket 520 extends from the other side of the flange bracket 496 and limits movement of the arm 480 and the pivotable bracket 486 away from the inner edge of the ware in response to an extension of air cylinder rod 516, thus preventing the grinding unit from touching the vacuum chuck of the spindle support arrangement.

The flange bracket 496 has and lower grooves for receiving support tongues from the frame 398, as was described with respect to flange bracket 396. An externally threaded adjustment rod 530 is received in mating threaded apertures in bracket 496. One end of the rod 530 is retained in an upwardly opening U-shaped bracket 532 by retaining collars 534 and 536 secured to the rod 530 on each side of the bracket 532. Thus, a turning of the end 538 of the rod 530 causes the flange bracket 496 to move for adjustment with respect to the vacuum chuck and the rotary spindle.

A drive shaft 550, best seen in FIG. 13, for the belt grinder supported by the grinder arm 480 extends from a belt grinder drive motor (not shown) for connection by a flexible drive coupling to the drive wheel or pulley of the belt grinder drive unit.

Figure 16:
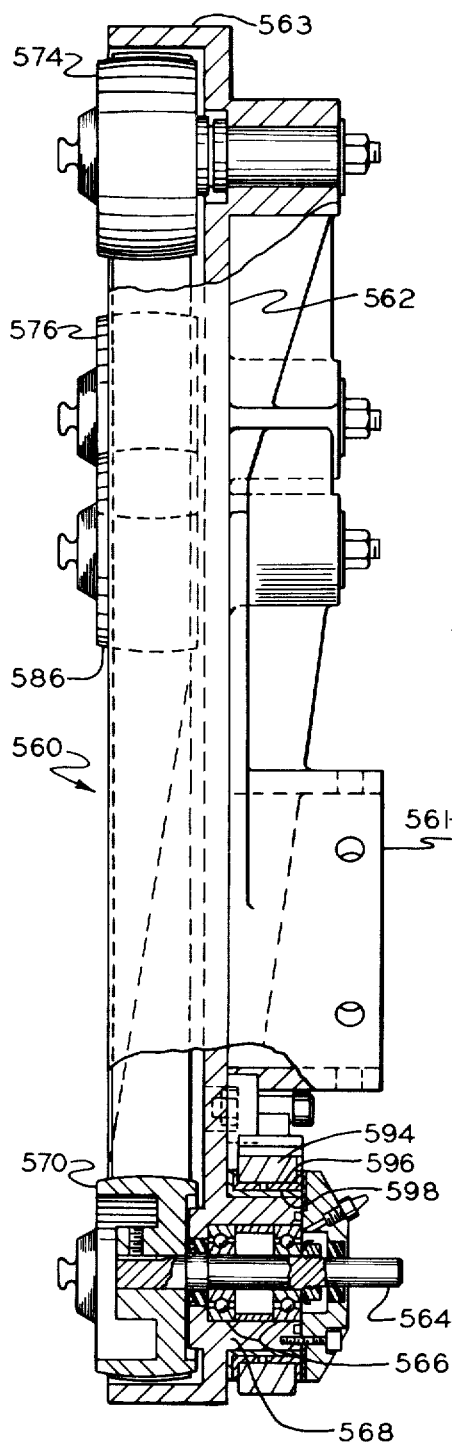
FIG. 16 is a side view of the apparatus illustrated in FIG. 15, taken from the left side thereof and partially in section.
Figure 15:
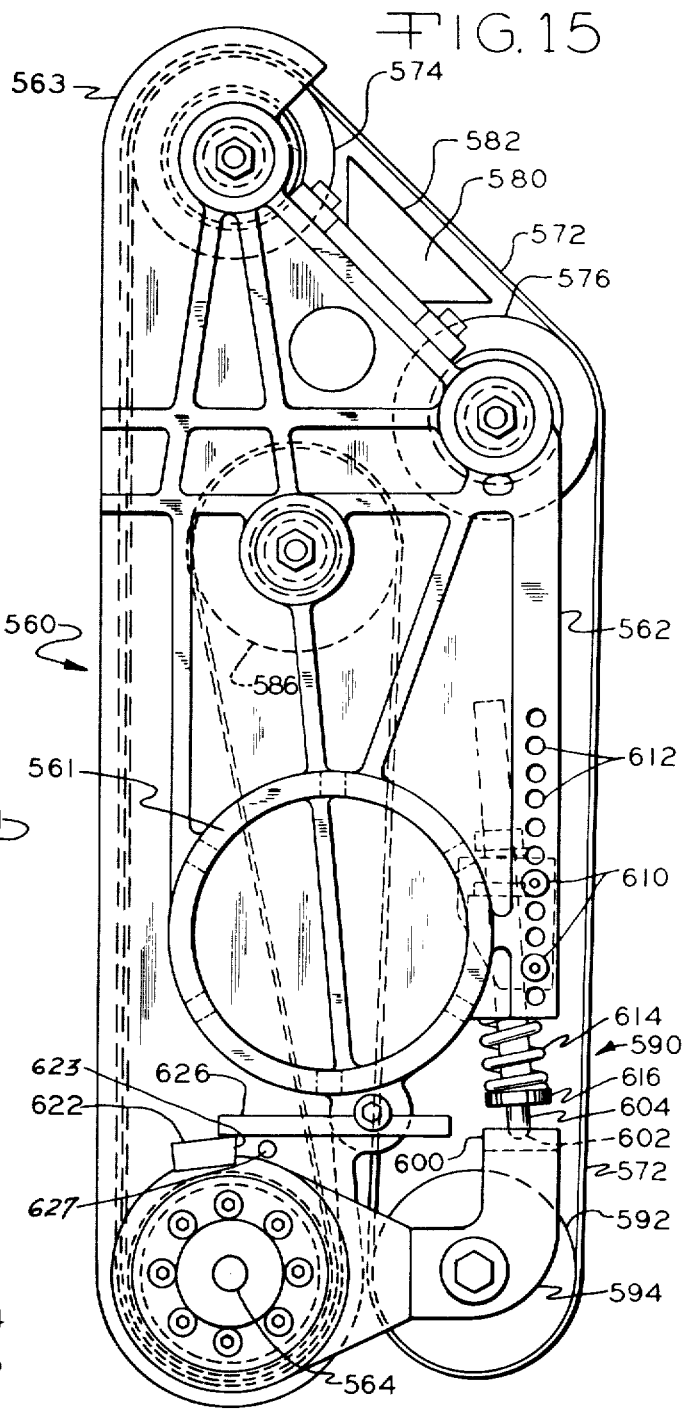
FIG. 15 is an elevational view of the belt drive unit for outside edge beveling.

Referring to FIGS. 15, 16 and 17 there is illustrated a belt drive unit designated generally at 560 for driving the abrasive belt to grind the outside edge of the vessel. A cylindrical connector 561 extends from the unit 560 and fits over the arm 380 for connection thereto.

The unit 560 comprises a vertical support plate 562 having reinforcing ribs extending between stress points on the plate. A guard flange 563 extends over exposed portions of the belt facing the outside of the machine and also adds structural rididity to the unit 560. A belt unit drive shaft 564 is journally supported in a bearing means 566 of a bearing housing 568. The shaft 564 is to be connected to the air motor shaft 450 by a flexible drive coupling.

A belt drive pulley 570 is secured to the other end of the shaft 564 extending on the other side of the plate 562. A belt 572 having an outwardly facing abrasive coating is trained around and driven by the pulley 570. A pair of spaced guide pulleys 574 and 576 are journally mounted on shafts carried in the upper portion of plate 562 and positioned relative to each other to guide the belt 572 at an inclination to an edge of the ware being operated upon. A belt backup plate or block 580 is positioned between pulleys 574 and 576 and has a guide surface 582 parallel to but behind an imaginary plane extending in tangential contact with the ware adjacent sides of the peripheries of pulleys 574 and 576. Thus the belt 572 can be urged inwardly between the pulleys in response to pressure between the vessel rim and the belt drive unit 560. An idler pulley 586 is journally mounted on a shaft held in plate 562 intermediate the drive pulley 570 and the guide pulleys 574, 576.

A belt tension apparatus is designated generally at 590 and includes a take-up pulley 592 journally mounted on a shaft carried in a take-up arm 594. The take-up arm 594 has a circular opening 596 formed in one end thereof. An annular split bushing means 598 on the inside of the circular opening 596 and on the outside of the bearing housing 568 pivotally supports the take-up arm 594.

The other end 600 of the arm 594 extends up and is flanged over the take-up pulley 594. A concavity 602 is formed in the upper surface of the flange 600 to receive a biasing pin 604. The pin 604 is slidably received in an aperture 606 formed in a bracket 608 selectively positioned on plate 562. The position of the bracket 608 is selected and maintained by bolts 610 inserted through two of the series of bolt holes 612 formed through the plate 562. A biasing spring 614 extends between the bracket 608 and a collar 616 secured to the lower end of the pin 604. Movement of the pin 604 away from the bracket 608 toward the take-up pulley is restrained by a nut 618 engaged with internal screw threads formed on the upper portion of the pin 604.

Thus, by turning the nut 618 in a first direction the pin 604 is backed away from the arm 594, compressing the spring 614 and allowing the take-up arm 594 to be pivoted counterclockwise to allow the belt to be placed on pulley 592. The nut 618 is then turned in the opposite direction to allow the pin 604 to be urged toward the end 600 of the arm 594 to provide belt tension in response to the spring force of the spring 614.

A stop member 622 is carried on the pivotally supported end of the take-up arm 594 and has a rightwardly facing stop surface 623 that cooperates with the left end of a pivotable stop bar 616 secured to the plate 562. In the position shown in FIG. 15, the take-up arm 594 has reached the limit of a pivotal movement in a clockwise direction against the belt 572 around pulley 592. Clockwise pivotal rotation of arm 594 in response to stretching or breaking of the belt 572 will bring the stop surface 623 of the stop member 622 into contact with a dowel pin 627 secured to and extending outwardly from plate 562, thereby limiting clockwise movement.

When the belt 572 is being installed, the arm 594 is rotated counterclockwise until the stop member 622 is past the end of stop bar 626. The stop bar 626 is pivoted downwardly to engage stop surface 623 and hold the arm 594 in the "up" position until the belt 572 is trained around pulley 594. The stop bar 626 is then moved upwardly out of the way of surface 623 to allow the arm 594 to pivot in a clockwise direction.

Figures 18, 19:
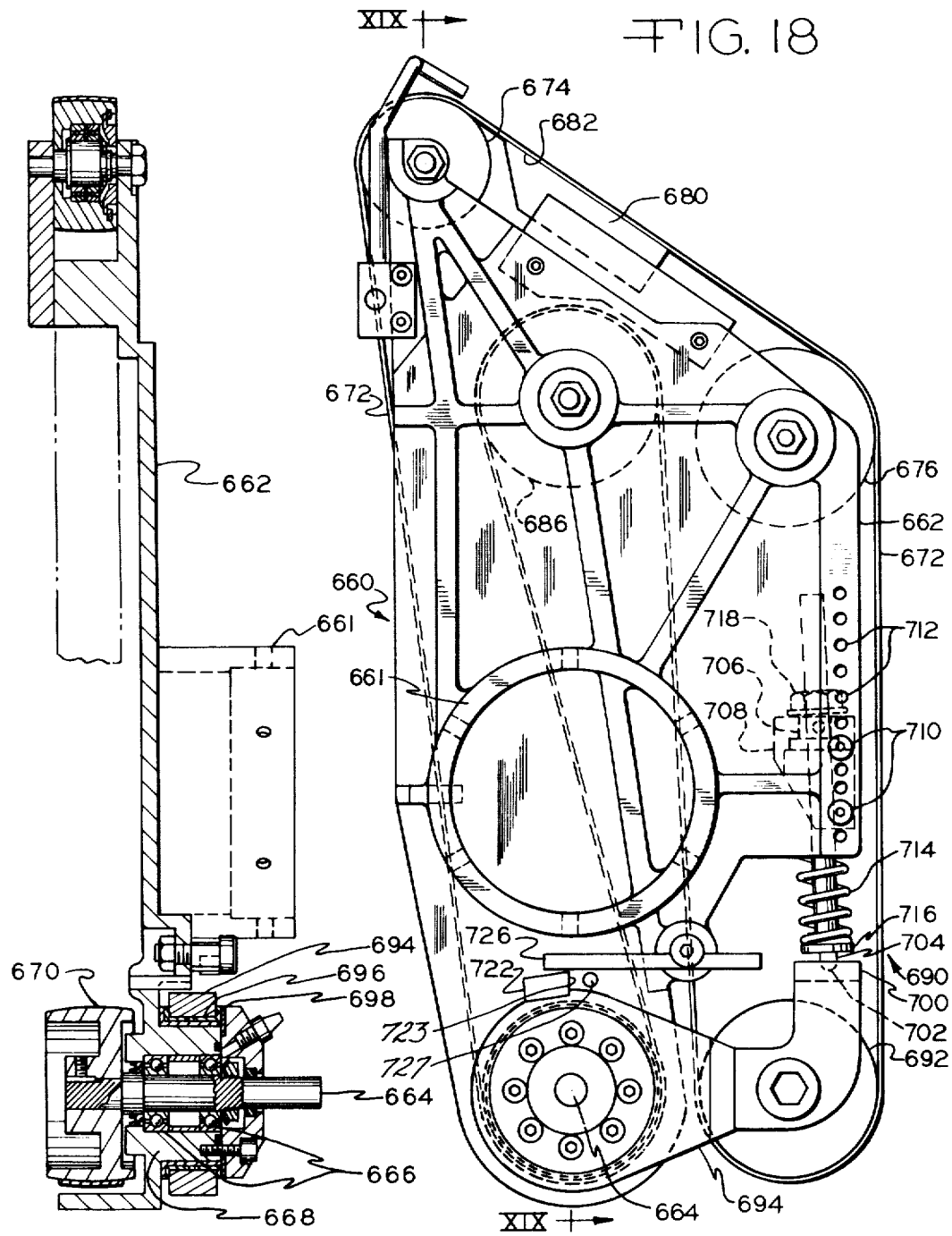
FIG. 18 is an elevational view of the belt drive unit for inside edge beveling.
FIG. 19 is a cross-sectional view of the apparatus of FIG. 18 taken along lines XIX—XIX of FIG. 18.

Referring to FIGS. 18, 19 and 20, an inside belt drive unit is indicated generally at 660. A cylindrical connector 661 extends from the unit 660 and fits over the grinder support arm 480 for connection thereto.

The unit 660 includes a vertical support plate 662 having reinforcing ribs extending between stress points therein. A belt unit drive shaft 664 is journally supported in a bearing means 666 in a bearing housing 668. The shaft 664 is to be connected to the air motor shaft 550 by a flexible drive coupling. A belt drive pulley 670 is secured to the end of shaft 664 extending on the other side of the plate 662. A belt 672 having an outwardly facing abrasive coating is trained around and driven by the drive pulley 670.

A pair of spaced guide pulleys 674 and 676 are journally mounted on shafts carried in the upper portions of plate 662 in positions relative to each other to guide the belt 672 at an inclination to an inner edge of the vessel being operated upon. A belt backup block or plate 660 is positioned between pulleys 674 and 676, and has a guide surface 682 parallel to an imaginary plane extending in tangential contact with the ware adjacent side of the peripheries of the pulleys 674 and 676. However, guide surface 682 is preferably positioned immediately adjacent to the back of the belt 672 permitting very little inward deflection of the belt. An idler pulley 686 is journally mounted on a shaft held in the plate 672 intermediate the drive pulley 670 and the guide pulleys 674, 676.

A belt tensioning apparatus for the unit 660 is designated generally at 690 and includes a take-up pulley 692 journally mounted on a shaft carried in a take-up arm 694. The take-up arm 694 has a circular opening 696 formed in end thereof. An annular split bushing means 698 is mounted on the inside of the opening and on the outside of the bearing housing 698 to pivotally support the take-up arm 694.

The other end 700 of arm 694 extends up and is flanged over the take-up pulley 693. A concavity 702 is formed in the upper surface of the flange 700 to receive a biasing pin 704.

The pin 704 is slidably received in an aperture 706 formed in a bracket 708 selectively positioned on plate 662. Bolts 710 are inserted through two of the series of bolt holes 712 formed through the plate 662 to position the bracket 708. A biasing spring 714 extends between the bracket 708 and a collar 716 secured to the lower end of the pin 704. Movement of the pin from the bracket 708 toward the pulley 694 is restrained by a nut 718 engaged with external screw threads formed on the upper portion of the pin 704. Operation of the nut 718 in placing a belt on pulley 692 is the same as that described for nut 618 in FIGS. 15 and 17.

A stop member 722 is carried on the pivotally supported end of the take-up arm 694 and has a rightwardly facing stop surface 723 that cooperates with a stop bar 726 pivotally secured to the plate 662 in the same manner as that described for stop member 622 and stop bar 626 in FIG. 15. Similarly, a dowel pin 727 is secured to and extends outwardly from plate 662 to perform the same function as dowel 627 in FIG. 15.

Figure 21A:
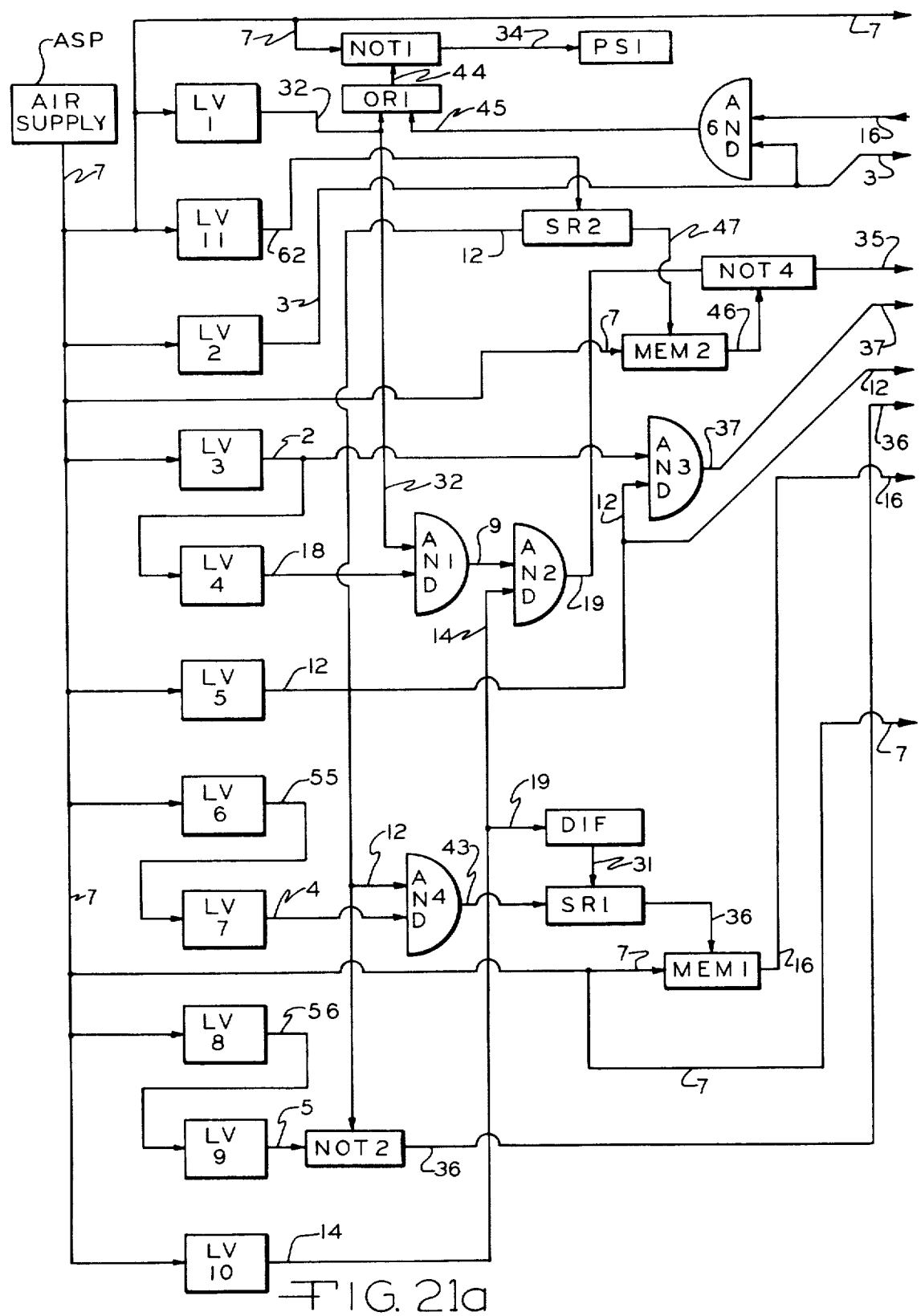
FIGS. 21a and 21b are schematic diagrams of a pneumatic control circuit for the apparatus illustrated herein.
Figure 21B:
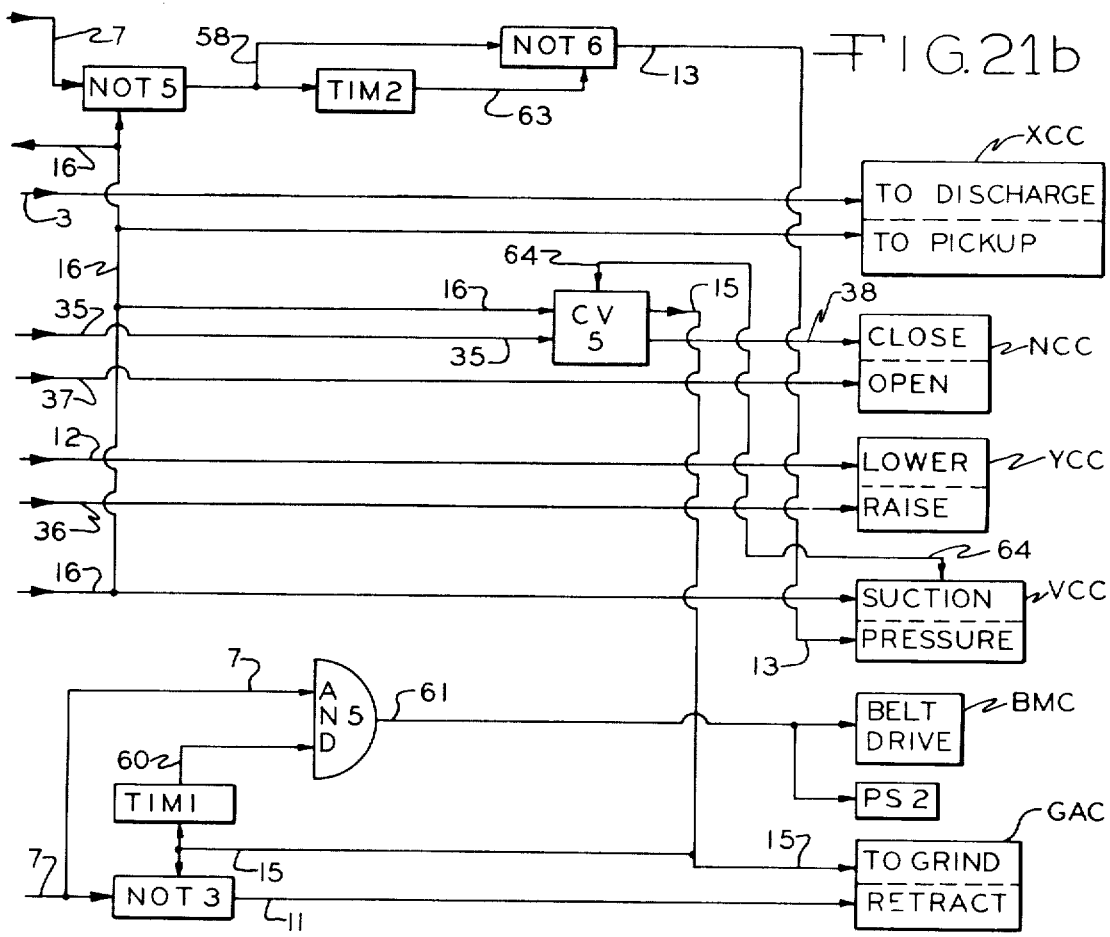
Figure 22:
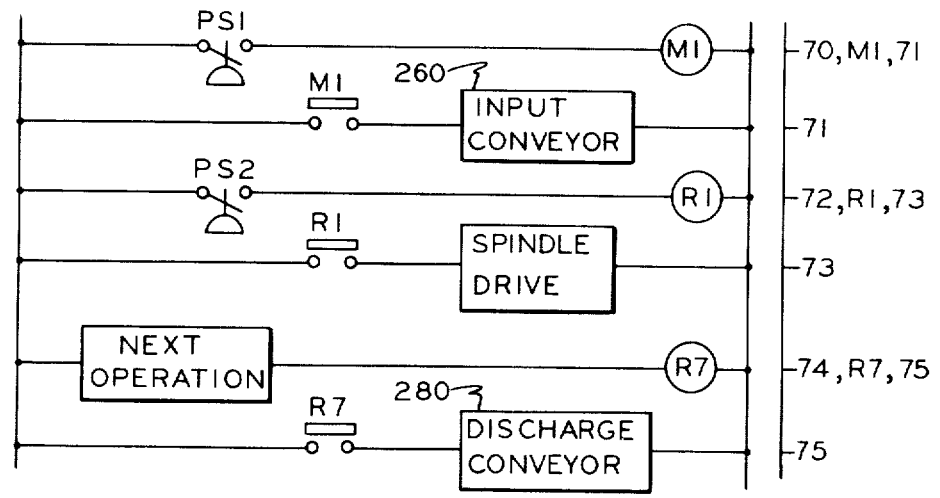
FIG. 22 is a schematic diagram of an electrical control circuit for the apparatus herein.

Referring now to FIGS. 21a, 21b, and 22, there is illustrated an air control system schematic and an electrical control schematic suitable for use with the apparatus described hereinbefore. The lines representing air conduits in FIG. 21a may be matched with the lines representing air conduits in FIG. 21b by placing the drawings 21a and 21b side by side to enable following of the description of the complete system control schematic.

Although pneumatically operated logic or function units are described, it will be understood that mechanically, electrically, or otherwise actuated units may be used to achieve the same functions. In the drawings a NOT logic unit will provide an output signal as long as an input control signal is not present to inhibit the output signal. An AND logic circuit requires a coincidence of all of the plurality of input control signals before an output signal occurs. An OR logic unit will provide an output signal if any of a first or a second input control signals are present. A time delay unit TIM will provide an output after a predetermined delay time has elapsed after receipt of an input control signal. A set-reset gate SR will provide an output signal in response to receipt of a first input control signal which will continue until a second input signal is received to terminate the output signal. A memory logic unit MEM will produce an output signal as long as it is receiving an input control signal. A differential pressure sensing unit DIF provides a pulse output upon receiving an input signal. The input must be removed and replaced to provide another output pulse signal.

Before each cycle can be initiated the last piece of ware transferred to the discharge station must have proceeded far enough along the discharge conveyor 280 to be out of the way to permit the transfer of the next piece of ware from the spindle to the discharge station. The presence of ware at the discharge station is detected by the limit valve LV11 mounted above the discharge conveyor 280 as noted hereinbefore. The limit valve LV11 receives an input in conduit 7 from an air supply source ASP and will provide an output or reset pulse to a set-reset unit SR2. The output from the set-reset unit SR2 in conduit 47 to a control input of a memory unit MEM2 is then cut off. The output from the memory unit MEM2 in conduit 46 to the inhibit input of a logic unit NOT 4 is cut off. The logic unit NOT4 is now able to pass a signal in conduit 19 from the logic unit AND2 through conduit 35 to the "close" section of a neck clamp control device NCC.

The discharge conveyor 280 may be connected to supply the components received thereon to a successive operation. If the discharge conveyor is controlled by the requirements of the successive operation, the slowing or cessation of component processing through the subsequent operation will result in a discharge component remaining at the discharge station 96. This will prevent the transfer and beveling cycles of the machine 90 as just noted, and thus the operation of the automatic edge beveler is slaved to the operation of a successive station by the sensing of the readiness of the successive station to receive ware.

To maintain a continuous supply of components at the input station 96 the input or delivery conveyor 260 is controlled by the requirements of the automatic edge beveling unit 90. Referring to FIG. 22 it can be seen that the input conveyor is driven only when M1 contacts are closed in line 71. The relay M1 appears in line 70 and is energized only when pressure switch contacts PS1 are closed. Referring back to the air control system schematic, it will be noted that ehe logic unit NOT1 controls the supply of air under pressure from the supply conduit 7 to a conduit 34 connected to the pressure switch PS1. The limit valve LV1 detects the presence of ware at the input station 92 and, when ware is present, provides an output signal in conduit 32 through the logic unit OR1 to conduit 44 as an inhibiting input signal to the logic unit NOT1. When a signal is present in conduit 44, the logic unit NOT1 cannot provide an output signal in conduit 34 to the pressure switch PS1. Thus when ware is present at the input station 92, a signal through the logic unit OR1 to the logic unit NOT1 cuts off the signal to the pressure switch PS1, PS1 contacts open in line 70 of FIG. 22, and relay M1 is deenergized opening M1 contacts in line 71 of FIG. 22 to stop the input conveyor 260.

Before the transfer and beveling cycle can be initiated, ware must be present at the pick up or input station 92. As noted hereinbefore this is sensed by the limit valve LV1, which provides an output in conduit 32 when ware is present to the logic unit AND1. In addition, before the cycle can be initiated, the carriage 130 must be down as sensed by limit valve LV3 which provides an output in conduit 2 to limit valve LV4. When the carriage 100 is moved longitudinally back the arrival to pick up position is sensed by the limit valve LV4 which passes the signal in conduit 2 from limit valve LV3 through conduit 18 to the other input of the logic unit AND1.

In response to a coincidence of input signals in conduits 32 and 18 at the logic AND1, and output is provided in conduit 9 which is applied as one of two inputs to the logic unit AND2. When the edge beveling station completes its beveling cycle and the rotating spindle has arrived at the stop position as sensed by the limit valve LV10, an output is provided from the limit valve LV10 in conduit 14 to the other input of the logic unit AND 2. The coincidence of inputs in conduits 9 and 14 at the logic unit AND2 provides an output in conduit 19 to supply input of the logic unit NOT4. If the ware is gone from the discharge station 96, as sensed by limit valve LV11 and discussed hereinbefore, then the logic unit NOT4 is not receiving an inhibit input signal in conduit 46 away from the memory unit MEM2 and passes the supply signal in conduit 19 to the conduit 35 and the switching valve means CV5. The switching valve CV5 may be a four way control valve normally connected to pass the signal from the conduit 35 to the conduit 38. The connection of conduits 16 to conduit 15 by valve CV5 will be discussed hereinafter. A signal in conduit 38 is applied to the "close" section of the neck clamp control NCC and causes the neck clamps to close on the necks of funnels at the input station 92 and the beveling station 94.

The neck clamp control NCC may be a four way, detented, double pilot control valve control the supply of air under pressure to the air cylinders 140, 190 on carriage 130 in FIG. 6.

The closure of the neck clamps is sensed by the limit valves LV8 and LV9 which are connected in series to pass a signal from the supply conduit 7 through conduits 56 and 5 to the supply input of a logic unit NOT2. The logic unit NOT2 passes a signal supplied in conduit 5 unless the carriage 100 is at the discharge position as sensed by the limit valve LV5 and an output therefrom in conduit 12 is applied to the inhibit of the logic unit NOT2. Since the carriage 100 is not at the discharge position at this time, the logic unit NOT2 passes the signal in conduit 5 to conduit 35 where it is applied to the "raise" section of the control device YCC. The control device YCC may be a four way, detented, double pilot control valve which controls the supply of air under pressure to the air cylinder 140. The receipt of a signal from conduit 36 causes the control device YCC to apply pressure to the cylinder 140 to cause the rod 142 to lift the carriage 130.

The arrival of the carriage 130 at its uppermost position is sensed by the limit valve LV2 which provides an output signal in conduit 3 to the "to discharge" section of the control device XCC. The control device XCC may be a four way, detented, double pilot control valve which controls the supply of air under pressure to the air cylinder 116. The receipt of a signal from conduit 3 causes the control device XCC to apply air under pressure to air cylinder 116 to extend piston rod 118 to move the carriage 100 longitudinally to the right to the discharge position.

The arrival of carriage 100 at the discharge position is sensed by the limit valve LV5 which provides an output in conduit 12 to the "lower" section of the control device YCC. In response to receipt of a signal in conduit 12 the air pressure connections are reversed to the cylinder 140, causing a retraction of the rod 142 and a lowering of the carriage 130 to the component release position.

At the same time the limit valve LV5 also delivers a signal in conduit 12 to the logic unit NOT2 to inhibit the output from the unit NOT2 to the raise section of the control device YCC. In addition, the limit valve LV5 also delivers a signal to the set-reset unit SR2 to enable an output in conduit 47 to the memory unit MEM2. The memory unit MEM2 now supplies a signal in conduit 46 to the logic unit NOT 4 to inhibit any output from unit NOT4 to the switching valve CV5 and thus to the closed section of the neck clamp control NCC.

The limit valve LV5 also delivers a signal in conduit 12 to one input of the logic unit AND3. When the carriage 130 reaches the lowr discharge position, its arrival is sensed by the limit valve LV3 and an output is provided in conduit 2 to the other input of the logic unit AND 3. The coincidence of inputs from conduits 2 and 12 enables the logic unit AND3 to provide an output in conduit 37 to the open section of the neck clamp control NCC. The control NCC causes the neck clamps to open and the ware to be released at the beveling station 94 and the discharge station 96.

The limit valve LV5 also delivers a signal, when the carriage 100 is at the component release or deposit position, to one input of the logic unit AND4. When the neck clamps have opened a signal is provided from conduit 7 through the limit valve LV6, conduit 65, the limit valve LV7, and through conduit 4 to the other input terminal of the logic unit AND4. The coincidence of input signals in both conduits 4 and 12 causes the logic unit AND4 to provide an output in conduit 43 to set the set-reset gate SR1. An output from the unit SR1 to the memory unit MEM1 is then maintained unitil unit SR1 receives a reset signal in conduit 31. Memory unit MEM1 now provides an output signal in conduit 16.

The output from unit MEM1 is applied to the suction section of the vacuum chuck control VCC causing the vacuum chuck head 340 to clamp the ware in beveling position on the rotary spindle. The control VCC may include a four way, pilot operated, spring return control valve which controls the connection of a vacuum source and a release pressure to the vacuum chuck 340.

The signal from unit MEM1 in conduit 16 is also applied as an input to the logic unit NOT5 to inhibit the output from the unit NOT5 and from the logic unit NOT6 to prevent any output in conduit 13 to the pressure section of the vacuum chuck control VCC.

When a partial vacuum is created and the vacuum chuck has clamped the ware on the spindle in edge beveling position, a signal is established in conduit 64 from the section section of the vacuum chuck control VCC and is applied to the switching valve CV5. The valve CV5 then disconnects conduit 35 from conduit 38 and connects conduit 16 to conduit 15. The signal from unit MEM1 in conduit 16 is thus connected through the switching valve CV5 to the conduit 15 and applied to the to grind section of the grinder arm control GAC. The grinder arm control GAC includes connections to the grinder retract cylinders 412, 512 in FIG. 12, to cause piston rods 416, 516 to move away from grinder support arms 380, 480 to permit springs 400, 500 to urge the edge beveling units 550, 660 into beveling position against the rim of the ware on the rotary spindle. The signal in conduit 15 is also applied to the input of logic unit NOT3 to inhibit the signal in conduit 11 to the retract section of the grinder arm control to prevent application of pressure to the other ports of cylinders 412, 512.

In addition, the signal in conduit 15 is applied to the time delay unit TIM1 which, after a delay, provides an output in conduit 60. If air pressure is available in the supply conduit 7, the logic unit AND5 has a coincidence of signals in conduits 7 and 60 and provides an output in conduit 61. The output in conduit 61 is applied to a belt motor control BMC to start the belt motors to drive the grinding or beveling units 550, 660, and is also applied to the pressure switch PS2. Contacts PS2 are closed in line 72 of FIG. 22 to energize relay R1. The R1 contacts then close in line 73 to energize a rotary spindle drive and start the rotation of the ware of the vacuum chuck head.

An output from the memory unit MEM1 in conduit 16 is also applied to the to pick up section of the control XCC, causing the carriage 100 to move back to the pick up position, with the carriage 130 remaining in the down position the neck clamps open. The neck clamps are designed to open far enough to avoid contact with the ware as they pass the necks in an open position.

When the carriage 100 arrives at the pick up position, the transfer cycle is repeated and is interrupted only by the absence of ware at the pick up station as indicated by the limit valve LV1, the presence of ware at the discharge station 95 as sensed by the limit valve LV11, or if the edge beveling unit has not completed or is unable to complete its beveling cycle.

The latter exception is sensed by a beveling signal in conduit 16 from the memory unit MEM1. This signal will be present until thhe completion of one revolution is sensed by the limit valve LV10 which provides an output in conduit 14. The change in pressure in conduit 14 is sensed by the differential unit DIF which provides an output in conduit 31 to reset the set-reset gate SR1 to cut off the signal in conduit 36 to the memory unit MEM1 and thus inhibit the output from the unit MEM1 in conduit 16. But, if a vacuum was never satisfactorily established by the vacuum chuck the lack of a signal in conduit 64 to the switching valve CV5 does not cause the valve to switch connections as described hereinbefore, thus not providing an output in conduit 15 to the belt drive control BMC or to the pressure switch PS2. Therefore, the pressure switch PS2 does not cause the spindle to rotate and rotation or cycle completion cannot be sensed by the combination of the limit valve LV10 and the differential unit DIF.

As long as the beveling cycle is not completed for any reason, the beveling signal remains in conduit 16. The connection of conduit 16 to the to pick up section of the control XCC maintains the instructions to keep the carriage 100 to the left, even through another signal is received at the to discharge section. Thus the carriage 130 would stop in the up position and the operator would be alterted that a beveling cycle had not been completed for the ware just picked up from the beveling station, enabling an examination of the unit to locate the malfunction and to enable removal or recycling of the ware that has not been beveled.

When the carriage 130 stops in the up position and the beveling signal remains in conduit 16 from unit MEM1, there is a coincidence of input signals to the logic unit AND6 in conduits 3 and 15. An output is then provided from unit AND6 through conduit 45, unit OR1 and conduit 44 to the inhibit input of unit NOT1. The output from unit NOT1 to the pressure switch PS1 is then removed and the delivery conveyor shut down as described hereinbefore.

In a normal cycle, an output from the limit valve LV10 is sensed by the differential unit DIF, the differential pressure unit DIF provides an output on line 31 to reset the set-reset gate SR1. The output from unit SR1 on conduit 36 to the memory unit MEM1 is removed interrupting the output on conduit 16 to remove the signal to the suction section of the vacuum chuck control VCC, to remove the signal through the switching valve CV5 to the to grind section of the grinder arm control GAC, to remove the inhibit signal from the logic unit NOT3 permitting an output from unit NOT3 to the retract section of the grinder arm control GAC, to remove the signal from the timing unit TIM1 to turn off the belt drive control BMC and to remove pressure from pressure switch PS2 to turn off the spindle motor, and to remove the inhibit signal from the logic unit NOT5 permitting an output in conduit 58 to supply the logic unit NOT6 and the time delay unit TIM2.

The output signal from the logic unit NOT5 is passed by the logic unit NOT6 until a preset time delay elapses and a signal is supplied from the time delay unit TIM2 to inhibit the output from the logic unit NOT6. While the logic unit NOT6 is supplying an output in conduit 13 to the pressure section of the vacuum chuck control VCC, a positive pressure is applied for a short time to the pressure section of the vacuum chuck control to cause a positive pressure release of the hold of the chuck on the ware. The output signal from the vacuum chuck control VCC to the switching valve CV5 in conduit 64 is positively interrupted noting that a vacuum is no longer established, thus switching the valve CV5 to connect conduit 35 to conduit 38 to enable a signal to be applied to the closed section of the neck clamp control NCC.

There has thus been disclosed and described apparatus for carrying out the method of this invention, which includes a main base or frame to support the various components in spaced and cooperative relationships with each other.

In the preferred embodiment there is a section of powered roller input conveyor and an alignment fixture arranged to receive and position the ware for pick up. On the side of the base are two longitudinal rails upon which is mounted a first carriage which can be moved back and forth along the base. The first carriage includes two vertical rails upon which a second carriage can move vertically up and down.

The second carriage includes two arms which extend over the center of the input conveyor and a vertical spindle mounted on the machine base in line with the center of the alignment fixture. The two arms have powered clamps on the ends which can grasp the necks of subassemblies.

When the ware is grasped by the powered clamps, the second carriage moves up in a vertical direction to raise the ware from the input conveyor and the spindle. The first carriage is then moved horizontally to move the ware from the input conveyor to the spindle, and the ware from the spindle to a second powered roller output or discharge conveyor.

At the end of the horizontal travel of the first carriage, the second carriage moves the ware down and the clamps are opened to release a first place of ware onto the spindle and a second piece of ware onto the discharge conveyor. The two carriages then move horizontally back to the pick up position.

The ware on the spindle is held in place by a vacuum powered chuck. Two vertical plates are supported under the ware, carrying grinder belts powered by air motors. The support plates are mounted on pivotable arms that are free to move in and out under spring force to cause the belts to contact the seal edge of the ware as it rotates. One belt contacts the outside edge and the other belt contacts the inside edge.

The spindle is rotated one revolution to bevel all of both edges. When the spindle revolution is completed, another cycle of the machine is started. The machine is controlled by a pneumatic logic system which may be slaved to a downstream machine.

In conclusion, it is pointed out that while the illustrated example constitutes the practical embodiments of my invention, I do not limit myself to the exact details shown, since modification of these details may be made without departing from the spirit and scope of this invention.

I claim:

1. Apparatus for automatically beveling the rim of a vessel having an open end comprising
   a. rotatable spindle means;
   b. vacuum chuck means mounted on the top of said rotatable spindle means for selectively clamping said vessel to said spindle means with the rim depending;
   c. means for selectively beveling the rim of said vessel, and
   d. means responsive to the clamping of a vessel by said vacuum chuck means for initiating rotation of said spindle means.

2. Apparatus for automatically beveling the rim of a vessel having an open end comprising
   a. rotatable spindle means;
   b. vacuum chuck means mounted on the top of said rotatable spindle means for selectively clamping said vessel to said spindle means with the rim depending;
   c. means for selectively beveling the rim of said vessel; and
   d. means responsive to the completion of a rim beveling cycle for deactivating said vacuum chuck means.

3. Apparatus as defined in claim 2 in which said vacuum chuck means includes means for yieldingly biasing said vessel away from a clamped position on said chuck means when a vacuum source is not connected to said vacuum chuck means.

4. Apparatus for automatically beveling the rim of a vessel having an open end comprising
   a. rotatable spindle means;
   b. vacuum chuck means mounted on the top of said rotatable spindle means for selectively clamping said vessel to said spindle means with the rim depending;
   c. means for selectively beveling the rim of said vessel; and
   d. means responsive to the completion of a rim beveling cycle for applying a positive pressure to said vacuum chuck means to insure release of said vessel from said vacuum chuck means.

5. Apparatus for automatically beveling the rim of a vessel having an open end comprising
   a. rotatable spindle means;
   b. vacuum chuck means mounted on the top of said rotatable spindle means for selectively clamping said vessel to said spindle means with the rim depending;
   c. means for selectively beveling the rim of said vessel; and
   d. means responsive to the clamping of a vessel by said vacuum chuck means for initiating operation of said beveling means.

6. Apparatus for automatically beveling the rim of a vessel having an open end comprising
   a. rotatable spindle means;
   b. vacuum chuck means mounted on the top of said rotatable spindle means for selectively champing said vessel to said spindle means with the rim depending;
   c. means for selectively beveling the rim of said vessel; and
   d. means responsive to the completion of a rim beveling cycle for deactivating said beveling means.

7. Apparatus for automatically beveling the rim of a vessel having an open end comprising
   a. rotatable spindle means;
   b. vacuum chuck means mounted on the top of said rotatable spindle means for selectively clamping said vessel to said spindle means with the rim depending;
   c. means for selectively beveling the rim of said vessel;
   d. means for yieldingly biasing said beveling means toward said vessel rim;
   e. means for retracting said beveling means away from said vessel rim; and
   f. means responsive to the clamping of a vessel on said vacuum chuck means for inhibiting operation of said retracting means to enable said beveling means to be biased into contact with said vessel rim.

8. Apparatus as defined in claim 7 which further includes means responsive to the completion of a rim beveling cycle for activating said retracting means to move said beveling means away from said rim.

* * * * *